US008644144B2

(12) United States Patent
Wang et al.

(10) Patent No.: US 8,644,144 B2
(45) Date of Patent: Feb. 4, 2014

(54) METHOD FOR MEASURING IP NETWORK PERFORMANCE AND CONTROLLING QOS, AND APPARATUS AND SYSTEM THEREOF

(75) Inventors: Jiangsheng Wang, Shanghai (CN); Zhichang Lai, Shanghai (CN); Yicheng Yang, Shanghai (CN); Yanyan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 13/251,679

(22) Filed: Oct. 3, 2011

(65) Prior Publication Data

US 2012/0026869 A1    Feb. 2, 2012

Related U.S. Application Data

(63) Continuation of application No. PCT/CN2010/000435, filed on Apr. 6, 2010.

(30) Foreign Application Priority Data

Apr. 4, 2009 (CN) .......................... 2009 1 0134106

(51) Int. Cl.
*H04L 1/00* (2006.01)
(52) U.S. Cl.
USPC .......................... 370/230; 370/231; 370/232
(58) Field of Classification Search
USPC ......... 370/230–232, 242, 248, 249, 252, 253, 370/255, 218, 225
See application file for complete search history.

(56) References Cited

U.S. PATENT DOCUMENTS

| 6,590,869 | B1 * | 7/2003 | Beyda et al. ................. 370/248 |
| 6,674,760 | B1 | 1/2004 | Warland et al. |
| 7,577,089 | B2 * | 8/2009 | Varada et al. ................. 370/217 |
| 7,697,422 | B1 * | 4/2010 | Arad et al. ..................... 370/229 |
| 7,729,268 | B2 * | 6/2010 | Matta et al. ................... 370/252 |
| 7,809,860 | B2 * | 10/2010 | McDysan ..................... 709/249 |
| 7,835,293 | B2 * | 11/2010 | Cidon et al. ................. 370/248 |
| 2002/0136162 | A1 * | 9/2002 | Yoshimura et al. ........... 370/229 |

(Continued)

FOREIGN PATENT DOCUMENTS

| CN | 15818484 A | 2/2005 |
| CN | 1592236 A | 3/2005 |
| CN | 1859233 A | 11/2006 |
| WO | WO 2010/111896 A1 | 10/2010 |

OTHER PUBLICATIONS

Chinese second Office Action mailed Jun. 14, 2012, issued in related Chinese Patent Application No. 200910134106.X (24 pages).

(Continued)

*Primary Examiner* — Huy D Vu
*Assistant Examiner* — Kuo T Chiang
(74) *Attorney, Agent, or Firm* — Leydig, Voit & Mayer, Ltd.

(57) ABSTRACT

The present invention discloses a method for measuring IP network performance and controlling IP network QoS, and apparatus and system thereof. In embodiments of the present invention, the information about the measurement contents, the data stream to be measured, and the measurement modes is sent to the IP network performance measurement peer end, and the end-to-end IP network performance measurement of the measurement contents of the data stream to be measured is started according to the measurement modes.

14 Claims, 27 Drawing Sheets

(56) References Cited

U.S. PATENT DOCUMENTS

| | | | |
|---|---|---|---|
| 2004/0052259 A1* | 3/2004 | Garcia et al. | ................. 370/392 |
| 2005/0169171 A1 | 8/2005 | Cheng et al. | |
| 2006/0285497 A1 | 12/2006 | Miller et al. | |

OTHER PUBLICATIONS

Brownlee et al., "Traffic Flow Measurement: Architecture; draft-ietf-rtfm-architecture-06.txt," *Internet Engineering Task Force*, No. 6 (May 2009).

Chen et al., "Internet Performance Monitoring," *Proceedings of the IEEE*, 90(9): 1592-1603 (Sep. 2002).

International Search Report from the Chinese Patent Office for International Application No. PCT/CN2010/000435, mailed Jul. 15, 2010.

Written Opinion of the International Searching Authority for International Application No. PCT/CN2010/000435, mailed Jul. 15, 2010.

Supplementary European Search Report, Communication regarding the transmission of the European Search Report, and European Search Opinion for EP Application No. 10757999.7, mailed Dec. 9, 2011.

Translation of First Chinese Office Action of Chinese Application No. 200910134106.X, mailed Oct. 8, 2011.

\* cited by examiner

METHOD FOR MEASURING IP NETWORK PERFORMANCE AND CONTROLLING QOS, AND APPARATUS AND SYSTEM THEREOF

This application is a continuation of International Application No. PCT/CN2010/000435, filed on Apr. 6, 2010, which claims priority to Chinese Patent Application No. 200910134106.X, filed on Apr. 4, 2009, both of which are hereby incorporated by reference in their entireties.

FIELD OF THE INVENTION

The present invention relates to wireless communications technologies, and in particular, to a method for measuring Internet Protocol (IP) network performance and controlling quality of service (QoS), and apparatus and system thereof.

BACKGROUND OF THE INVENTION

A traditional IP network provides only services without assuring the reachability, and does not provide services with QoS assurance. With the IP network more and more widely used in a telecommunications network, various QoS assurance mechanisms, for example, a differentiated service (DiffServ) mechanism, for improving IP network performance are introduced.

During the implementation of the present invention, however, the inventors find that in the prior art, the QoS assurance provided at the IP layer is still based on control of a per-hop behavior, and a solution to end-to-end IP network performance and QoS control is lacked.

SUMMARY OF THE INVENTION

The present invention provides a method for measuring IP network performance and controlling IP network QoS, and apparatus and system thereof.

In one aspect, the present invention provides a method for measuring IP network performance. The method includes:

adding, by a measurement initiator end, a classification ID in IP packet data according to the classification of the IP packet data, where the classification ID indicates a class to which the IP packet data belongs;

selecting at least one IP data stream as a data stream to be measured and determining measurement contents and measurement modes, where each IP data stream of the at least one IP data stream includes the IP packet data with the same classification ID; and sending information about the measurement contents, the a data stream to be measured, and the measurement modes to a measurement peer end, and starting measuring the IP network performance according to the measurement modes and the measurement contents when the data stream to be measured is transmitted between the measurement initiator end and the measurement peer end.

In another aspect, the present invention provides a method for controlling IP network QoS. The method includes:

obtaining measurement results of IP network performance, where the measurement results are the values of the measurement contents obtained according to the preceding method; and controlling the IP network QoS according to the obtained measurement results.

In another aspect, the present invention provides an apparatus for measuring IP network performance. The apparatus includes:

a classifying module, configured to classify IP packet data to form an IP data stream and add a classification ID to the IP data stream, where the classification ID indicates a class to which the IP data stream belongs;

a determining module, configured to select at least one IP data stream as a data stream to be measured, and determine measurement contents and measurement modes; and a starting module, configured to send combination information about measurement contents, the a data stream to be measured, and the measurement modes to a measurement peer end, and start an IP network performance measurement of the measurement contents of the data stream to be measured according to the measurement modes.

In another aspect, the present invention provides an apparatus for controlling IP network QoS. The apparatus includes:

an obtaining module, configured to obtain measurement results of IP network performance, where the measurement results are the values of the measurement contents obtained according to the preceding method; and a controlling module, configured to control the IP network QoS according to the obtained measurement results.

In another aspect, the present invention provides an IP network performance management (IPPM) system. The system includes the preceding controlling apparatus and the preceding measuring apparatus.

According to the preceding technical solutions, information about the measurement contents, the data stream to be measured, and the measurement modes is sent to the IP network measurement peer end, and an IP network performance measurement according to the measurement modes and measurement contents is started when the data stream to be measured is transmitted between the measurement initiator end and the measurement peer end, and therefore the end-to-end measurement is achieved. Requirements for measurement flexibility are satisfied by classifying the packet data into different data streams according to the classification criteria.

DETAILED DESCRIPTION OF THE EMBODIMENTS

Figure 1:
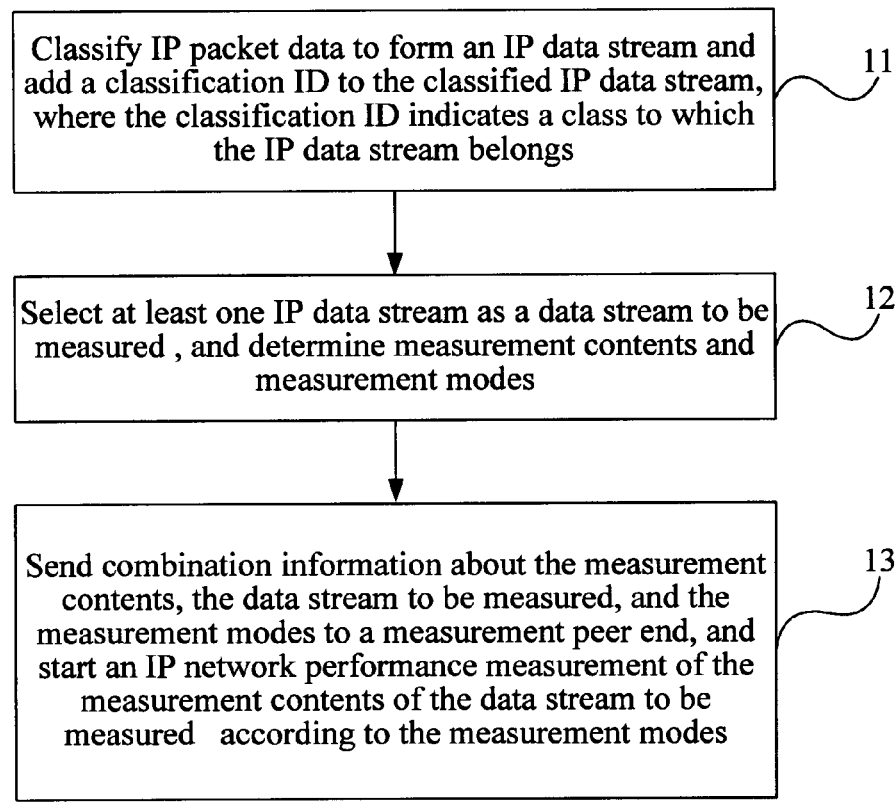
FIG. 1 is a schematic flow chart of a method for measuring IP network performance according to an embodiment of the present invention.

The following further describes the technical solutions of the present invention through the accompanying drawings and embodiments.

For a better understanding of the embodiments of the present invention, the following briefly describes some terms involved in the embodiments.

IP performance management (IPPM): refers to monitoring and measuring IP network performance in real time and controlling transmission or receiving of the IP data packets according to the measurement results.

End-to-end: A network element (NE), for example, a NodeB, is called an endpoint, and the connection between two NEs defines the context of "end-to-end". End-to-end "connection" is a connection based on an IP layer (differentiated by an IP address), or may further based on a transmission layer (differentiated by port). It can be understood that NEs satisfying the preceding definition of "end-to-end" may use the technical solutions provided in the embodiments of the present invention.

End-to-end connectivity: is a metric reflecting whether the packet data sent by a sending end can reach a receiving end in an end-to-end connection. The end-to-end connectivity defined in the embodiments of the present invention may be unidirectional connectivity. For example, the connectivity of A→B and B→A may be respectively defined.

Unidirectional delay: refers to, in an end-to-end connection, the delay metric between the time a sending end sends the last bit of a packet data and the time a receiving end receives the last bit of the packet data. In this case, the delay value is a nonnegative number.

Loopback delay: in an end-to-end connection, a sending end sends a data packet, and a receiving end returns a corresponding packet data after receiving the packet data; the loopback delay refers to the delay between the time the sending end sends the last bit of the data packet and the time the last bit of the corresponding returned packet data returned by the receiving end is received. In this case, the delay value is a nonnegative number.

Unidirectional delay jitter: refers to a metric as to the changes of the unidirectional delay within a measurement period (settable). Several methods are available for calculating the unidirectional delay jitter, for example, calculating the difference between the maximum unidirectional delay and the minimum unidirectional delay, or variance of the unidirectional delay.

Loopback delay jitter: refers to a metric as to the changes of the loopback delay within a measurement period (settable). Several methods are available for calculating the loopback delay jitter, for example, calculating the difference between the maximum loopback delay and the minimum unidirectional delay, or variance of the loopback delay.

Packet loss (ratio): the difference between the number of packets sent by a sending end and the number of packets received by a receiving end in an end-to-end connection, which may also be represented in a packet loss ratio (PLR, a percentage) form. The PLR is a nonnegative number.

Number of received bytes: is the number of bytes received by a receiving end within a period of time in an end-to-end connection. The sending end may estimate available bandwidth on a network according to the number of received bytes and time length.

DSCP value: refers to differentiated services code point value. When the DiffServ is used for QoS management, IP header is filled with a 6-bit value. The details may be referred to relevant protocols in the RFC 2474.

IPPM measurement negotiation packet: is a packet used for end-to-end parameter negotiation before the IPPM measurement begins, and is called "negotiation packet" for short.

IPPM measurement control packet: is a packet for controlling the IPPM measurement, for example, packets including an enabling command or a close command, and is called "control packet" for short.

IPPM measurement-related packet: is an associated or outband packet (such as a service packet or a measurement-dedicated packet) used for the IPPM measurement, and is a packet that carries information such as a query of a single measurement (measurement packet), a reply (reply packet), and a measurement result (measurement result packet).

FIG. 1 is a schematic flow chart of a method for measuring IP network performance according to an embodiment of the present invention.

Step 11: A measurement initiator end classifies IP packet data to form an IP data stream and adds a classification ID to the IP data stream, where the classification ID indicates a class to which the IP data stream belongs.

Step 12: The measurement initiator end selects at least one IP data stream as a data stream to be measured, and determines measurement contents and measurement modes.

Step 13: The measurement initiator end sends combination information about the measurement contents, the data stream to be measured, and the measurement modes to an IP network performance measurement peer end, and starts measuring the IP network performance of the measurement contents of the data stream to be measured according to the measurement modes.

According to this embodiment, the combination information about the measurement contents, the data stream to be measured, and the measurement modes is sent to the IP network performance measurement peer end. Measuring the IP network performance of the measurement contents of the data stream to be measured, according to the measurement modes, is started. The intermediate node neither processes the packets, for example, parses the packets, nor cares about the node type. In this manner, an end-to-end measurement is implemented. Through determining the classification criteria, the packet data may be classified according to the multiple classification criteria, and therefore requirements for measurement flexibility are satisfied.

The following describes each of the preceding steps respectively.

As regards step 11, "end-to-end" in the embodiment is described first, and then the classification criteria and classification ID are described.

Figure 2:
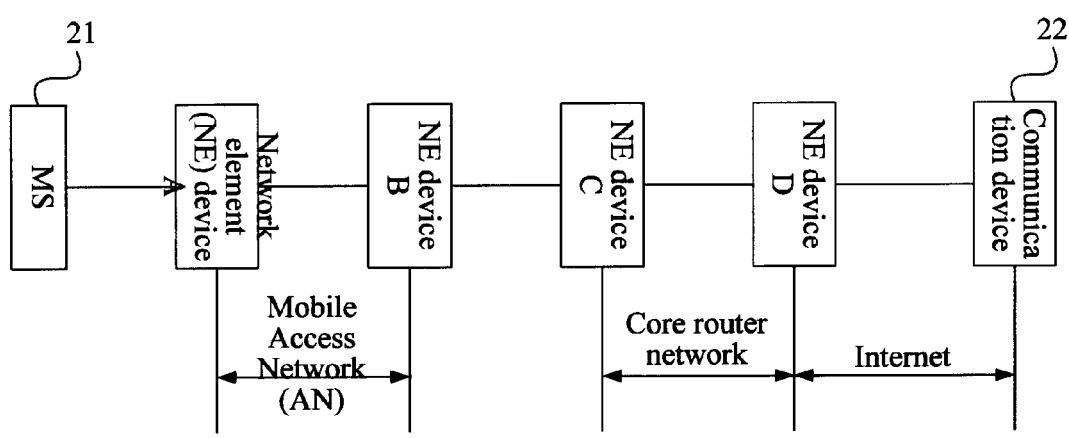
FIG. 2 is a schematic structural diagram of a network based on a radio transmission bearer network according to another embodiment of the present invention.

FIG. 2 is a schematic structural diagram of a network based on a radio transmission bearer network according to an embodiment of the present invention. In this embodiment, a mobile subscriber (MS) is used as an example of a mobile terminal, and of course, a mobile terminal in other network systems, such as a user equipment (UE), is also covered in the scope of the present invention. In this embodiment, a data service of an MS is used as an example, and of course, other services, such as a voice service, are also covered in the scope of the present invention. Referring to FIG. 2, in this embodiment, an MS 21 and another communication device 22 that communicates with the MS 21 are included. The communication device 22 may be an MS or a computer. The MS 21 connects to the Internet on another side through a mobile access network (AN) and a core network (CN). An NE device A, an NE device B, an NE device C, and an NE device D are involved in the communication process. After an MS 31 accesses the mobile AN, the data sent by the MS 31 is packed, and transmitted on the mobile AN and CN using a User Datagram Protocol (UDP)/IP or a generic routing encapsulation (GRE) tunnel as a carrier. At the exit of the CN, the data is unpacked, and an IP data packet of a subscriber is directly sent to the Internet.

Compared with traditional IP transmission, the radio transmission bearer network has the following features:

1. Point-to-point (P2P) transmission accounts for most of the traffic. Each node connects to a few other nodes and therefore the traffic is concentrated.

2. A transmission tunnel or a UDP data packet accounts for most of the traffic. Therefore, transmission without guarantee accounts for most of the traffic.

3. There is a great possibility of node burst.

4. Multiple access modes are available and QoS assurance mechanisms for accessing the network are different.

Based on the preceding features, the architecture and mode of end-to-end IP-QoS management and considerations of the implementation are described in this embodiment. "End-to-end" in this application represents UDP/IP transmission between A and B, B and C, and C and D in FIG. 2, where a connection, for example, connection between endpoint A and endpoint B, is defined as an "end-to-end" connection.

The end-to-end relationship among multiple endpoints in a wireless bearer network is described in FIG. 2. Because the end-to-end connection between two endpoints is used as a measurement unit during the measurement, the end-to-end relationship specifically between two endpoints is described in FIG. 3 in the following.

Figure 3:
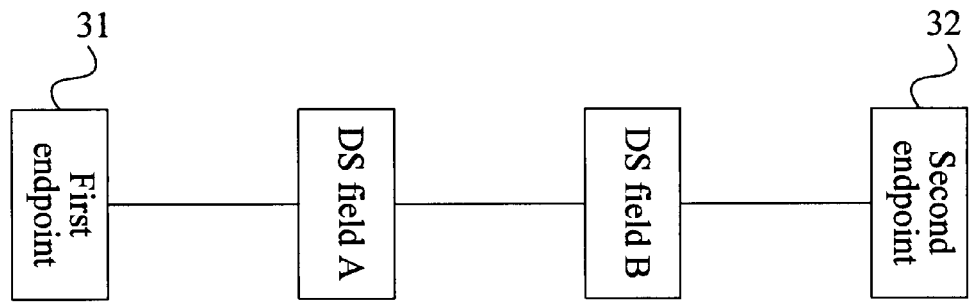
FIG. 3 is a schematic structural diagram of an end-to-end network according another embodiment of the present invention.

FIG. 3 is a schematic structural diagram of an end-to-end network according to an embodiment of the present invention. The network includes a first endpoint 31 and a second endpoint 32. The end-to-end network model neither considers the configuration, protocol, and architecture of the intermediate transmission network, nor limits the transmission path for IP packets. The end-to-end transmission path may be various. In this embodiment of the present invention, an example that network QoS control is based on a model is used, but the models on which the network QoS control is based are not limited to the model. The end-to-end connection may span multiple (DS) fields. For example, an example that the end-to-end connection spans two DS fields is used in FIG. 3. The solution in this embodiment of the present invention is implemented at endpoints and has no special requirements for bearer network NEs. The involved measurement is implemented between the endpoints and is transparent to the bearer network NEs. In this embodiment of the present invention, each endpoint corresponds to a measuring apparatus and a controlling apparatus. The measuring apparatus is configured to measure all types of IP network performance, and the controlling apparatus is configured to perform corresponding control according to the measurement results. In general, the QoS of the endpoint is controlled according to the local measurement results. The measurement results obtained by the peer end do not serve as the input of the QoS control of the local end One exception is that the receiving end may perform corresponding control according to measurement results of the sending end when a passive measurement mode is used for connectivity measurement. Details may be referred to the following description.

The end-to-end relationship between two endpoints is described in FIG. 3. Because each endpoint may be divided into different layers, the relationship between the layers of each endpoint is described in FIG. 4 in the following.

Figure 4:
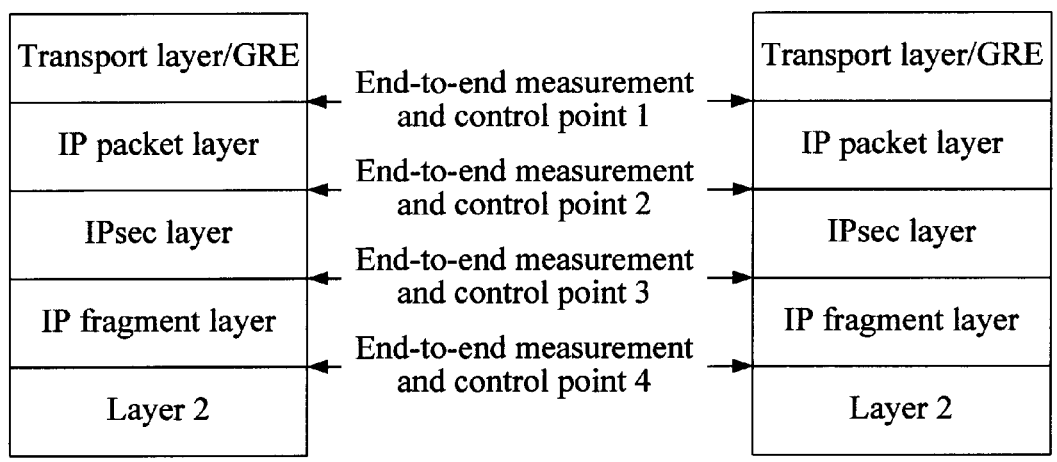
FIG. 4 is a schematic structural diagram of a layered end-to-end network according another embodiment of the present invention.

FIG. 4 is a schematic structural diagram of a layered end-to-end network according an embodiment of the present invention. Referring to FIG. 4, each endpoint includes a transmission layer/GRE, an IP layer, and a data link layer (L2). The IP layer may be divided into an IP packet layer, an IP security (IPsec) layer, and an IP fragment layer. The corresponding layers may be divided into an end-to-end measurement and control point 1, an end-to-end measurement and control point 2, an end-to-end measurement and control point 3, and an end-to-end measurement and control point 4. It should be noted that FIG. 4 is for exemplary purpose only. During practical implementation, some layers, such as the IPsec layer or the IP fragment layer, may not use the measurement and control point. The upper-layer protocol of the IP layer may be a transmission layer protocol such as a UDP or a Transmission Control Protocol (TCP), or may also be a GRE tunnel.

In this embodiment of the present invention, the measurement and control may be performed at the end-to-end peer layers or between the processing modules. For example, the measurement and control is performed between the end-to-end measurement and control point 1 at a first endpoint and the end-to-end measurement and control point 1 at a second endpoint. During practical implementation, the measurement and control point may be preconfigured at a specific layer, or the layer where the measurement and control point is located may be determined through negotiations by two endpoints. The preceding peer measurement and control apply to the measurement and control points at each layer. It should be noted that, IPsec may use the transmission mode or tunnel mode (even though for IPsec on the same node). The implementation of the IPsec is not limited in this embodiment.

Selecting an appropriate measurement and control point is very important for implementing QoS. For example, in the scenario of implementing end-to-end IPsec, if the measurement is performed at the end-to-end measurement and control point 2, insecure external attack packets may be prevented from being included in measurement statistics; if the measurement is performed at the end-to-end measurement and control point 3, existence of insecure packets may be sensed. A mode combining the measurement at the end-to-end measurement and control point 3 and measurement at the end-to-end measurement and control point 2 may effectively analyze the actual service packet loss ratio (PLR) and to some extent analyze the cause of packet loss.

Therefore, the measurement endpoint in this embodiment of the present invention may be specifically located at a layer of each NE device. Furthermore, the preceding measurement point and control point may be different. For example, the measurement may be performed at the end-to-end measurement and control point 4, but the control according to the measurement result may be implemented at any one or multiple points of the end-to-end measurement and control points 1-4.

FIG. 2, FIG. 3, and FIG. 4 describe the definition and content of "end-to-end" in this embodiment. The following describes the classification criteria which are used to classify IP packet data. During implementation, different classification criteria may be set according to actual needs.

The classification criteria (or called as measurement granularities) may include a source IP address, a destination IP address, and any one or combination of an IP data packet size, a DSCP value, a GRE key, a UDP port ID, a protocol ID, IPsec SA, and an IP stream identifier. The specific classification criteria may be shown in Table 1.

TABLE 1

(packet size, source IP address, and destination IP address)
(packet size, source IP address, destination IP address, and DSCP value)
(packet size, source IP address, destination IP address, DSCP value, and protocol ID)
(packet size, source IP address, destination IP address, DSCP value, protocol ID, and destination port ID)
(packet size, source IP address, destination IP address, and GRE key)
(packet size, source IP address, destination IP address, DSCP value, and GRE key)
(packet size, source IP address, destination IP address, protocol ID, and destination port ID)
(packet size, source IP address, destination IP address, and IPsec SA)
(packet size, source IP address, destination IP address, and IPv6 Flow Label)

In addition, because of the possibility that endpoint IP layer fragments may exist, the first item and the second item of the preceding classification criteria may be re-divided into those before fragmentation and after fragmentation (features included in the remaining items in the table exist only before fragmentation).

Different data streams may be defined at the same time at one endpoint. For example, IP layer performance and port performance are measured at the same time. The preceding packet size may be defined as a range, such as 60-1500 bytes. The packet size may also be defined as a specific value, such as 576 bytes. Because the packet size may not be 0, the value "0" may be used to indicate "not concerned". An exemplary description is provided, as shown in Table 2.

TABLE 2

| Identification | Meaning of the Identification |
|---|---|
| [0, 0] | Any packet size |
| [0, 512] | Packet size < 512 bytes |
| [256, 1280] | packet size between 256 bytes and 1280 bytes |
| [576, 576] | Packet size = 576 bytes |
| [1000, 0] | Packet size > 1000 bytes |

The embodiment may include nine classification criteria according to Table 1. During implementation, classification criteria respectively supported by two endpoints may be pre-configured at the two endpoints. The two endpoints then negotiate and determine the classification criteria to be used for measurement. For example, if two endpoints determine through negotiations to use the second classification criterion in Table 1 to classify the data streams, assume that the source IP address is N1, the destination IP address is R1, and the DSCP values, when the data streams arrive at the destination endpoint, include the four values such as 101000, 011000, 001000, and 000000, the classification results may be shown in Table 3.

TABLE 3

1 (packet size ≤ 100, source IP address = N1, destination IP address = R1, and DSCP = 101000)
2 (100 < packet size ≤ 1000, source IP address = N1, destination IP address = R1, and DSCP = 101000)
3 (packet size > 1000, source IP address = N1, destination IP address = R1, and DSCP = 101000)
4 (packet size = any size, source IP address = N1, destination IP address = R1, and DSCP = 011000)
5 (packet size = any size, source IP address = N1, destination IP address = R1, and DSCP = 001000)
6 (packet size = any size, source IP address = N1, destination IP address = R1, and DSCP = 000000)

Therefore, according to step 11 in the first embodiment, the packet data may be classified into different classes to form data streams. For example, in Table 3, the packet data is classified into six types of data streams.

After the packet data is classified and forms data streams, it is required to determine which data stream needs to be measured as a data stream to be measured. Therefore, the data stream may be identified for differentiating different classes.

The data stream can be identified in the following modes.

Mode 1: The ID field of an IPv4 header is used to carry the classification ID.

The basic principle is that several bits in the ID fields are used to carry the classification IDs and the remaining bits are used to carry the IDs of different packets in the classification. Referring to an example in Table 4, the last M+1 bits ($BIT_M$-$BIT_0$) are assigned as the ID field, and the first 15-M bits are used as the classification ID (data stream ID) field. For ensuring uniqueness of the ID in the same class, bits as few as possible are assigned to the classification field. Meanwhile, sufficient bits need to be ensured for sufficient measurements, and a compromise is performed through the service traffic model and QoS planning. It should be noted that the implementation mode is not limited to that in Table 4. Other implementation modes can also be used. For example, the last bits or middle part in the ID field are used as the classification ID, or certain discontinuous bits are used as the classification field.

TABLE 4

| $BIT_{15}$—$BIT_{M+1}$ | $BIT_M$—$BIT_0$ |
|---|---|
| Classification field | Classification ID field of other information |

Because DiffServ is widely used on the IP network for QoS control, one implementation mode is to use the DSCP value as the classification field of the ID, as shown in Table 5. Another implementation mode is to use the first bits in the DSCP classification field, namely, classify the services into several types merely. In the IP network application, the first three bits of the DSCP value are used as the service type ID. The method for directly using the first three bits of the DSCP value as the service type ID may be referred to Table 6.

TABLE 5

| $BIT_{15}$—$BIT_{10}$ | $BIT_9$—$BIT_0$ |
|---|---|
| Classification field = DSCP | Classification ID field of other information |

TABLE 6

| $BIT_{15}$—$BIT_{13}$ | $BIT_{12}$—$BIT_0$ |
|---|---|
| Classification field = first three bits of the DSCP value | Classification ID field of other information |

The advantage of using the DSCP value as the classification field lies in that only several bits of the DSCP value need to be configured or negotiated, and there is no need to negotiate or configure the usage or mapping mode of the classification field.

Or, for improving flexibility, a classification field usage table may be configured or negotiated. The classification field does not have a fixed length and is variable. The DSCP value (or several bits of the DSCP value) may be used for assignment of the classification field, or other information, such as a protocol ID, may be added. For example, if best effort (BE) services account for a most proportion on a network, the first bit "0" is used to identify the classification as "BE". As regards other classes of packets, the first bit is "1" and several next bits are used to identify the sub-classification. In such a flexible mode, the efficiency of using the ID field is higher, and in addition, such classification is not limited to using the DSCP value as the classification criteria. Other fields, such as a port ID, a protocol ID, or a packet size may also be used as the classification criteria. For example, Table 7 is a classification table of the ID field.

TABLE 7

| ID Field Value | Classification |
|---|---|
| 0xxx xxxx xxxx xxxx | BE |
| 1110 xxxx xxxx xxxx | DSCP = 110xxx |
| 1011 111x xxxx xxxx | DSCP = 011111 |
| 1010 001x xxxx xxxx | DSCP = 010xxx, packet size < 100 bytes |
| 1000 1111 11xx xxxx | UDP port = 48583 |

In Table 7, "x" represents variable bits, and is used as an ID for differentiating different packets in this classification. Generation and usage of bits that are represented by "x" is not specified in this section.

For an end-to-end measurement, the mapping table between the ID and the classification is unidirectional. To be specific, the packet sending end (endpoint A in A→B) determines the mapping table and notifies the receiving end of the mapping table through negotiations or configuration. In a loopback measurement (for example, a loopback delay measurement), the sending end and the receiving end return through negotiations the ID mapping table used for the packet. A pair of packets in a loopback may use different ID classification modes, and the classification mapping is decided respectively by the sending end of each packet.

Mode 2: The Flow Label field of the IPv6 is used to carry the classification ID.

Similar to the case where the ID field in the IPv4 header is used to carry the classification ID, information about the service classification (data stream ID) may be carried in the Flow Label field. The implementation details are similar to the ID number of the IPv6, as shown in Table 8 and Table 9.

TABLE 8

| $BIT_{19}$—$BIT_{M+1}$ | $BIT_M$—$BIT_0$ |
|---|---|
| Classification field | Classification ID field of other information |

TABLE 9

| Flow Label Field Value | Classification |
|---|---|
| 0xxx xxxx xxxx xxxx xxxx | BE |
| 1110 xxxx xxxx xxxx xxxx | DSCP = 110xxx |
| 1011 111x xxxx xxxx xxxx | DSCP = 011111 |
| 1010 001x xxxx xxxx xxxx | DSCP = 010xxx, packet size < 100 bytes |
| 1000 1111 11xx xxxx xxxx | UDP Port = 48583 |

For an end-to-end measurement, the mapping table between the Flow Label and the classification is unidirectional. The packet sending end (endpoint A in A→B) determines the mapping table and notifies the receiving end of the mapping table through negotiations or configuration. In a loopback measurement (for example, a loopback delay measurement), the sending end and the receiving end return through negotiations the Flow Label mapping table used for the packet. A pair of packets in a loopback may use different Flow Label classification modes, and the classification mapping is decided respectively by the sending end of each packet.

Mode 3: The IPsec security association (SA) field is used to carry the classification ID.

In the scenario of implementing "end-to-end IPsec" security mechanism, different services may be classified in combination with different SAs. In the IPsec header, a security parameter index (SPI) is used to differentiate the SAs. The SPI is a 32-bit field in the IPsec header, such as an authentication header (AH) or an encapsulating security payload (ESP). This mode is similar to Mode 1 and Mode 2, and the only difference is that the classification is defined in the SPI identification of the SA. For an end-to-end measurement, the mapping table between the SPI and the classification is unidirectional. The packet receiving end determines the mapping table and notifies the sending end of the mapping table through negotiations or configuration. In a loopback measurement (for example, a loopback delay measurement), the sending end and the receiving end return through negotiations the SPI mapping table used for the packet. A pair of packets in a loopback may use different SPI classification modes, and the classification mapping is decided respectively by the sending end of each packet.

Mode 4: The GRE key field is used to carry the classification ID.

In a wireless transmission bearer, GER tunnels are commonly used, and the GRE tunnels are "end-to-end". If the key is used as the tunnel identification, classification modes similar to Modes 1-3 may also be used. The classification field only needs to be changed to the GRE key.

For an end-to-end measurement, the mapping table between the GRE key and the classification is unidirectional. To be specific, the packet receiving end determines the mapping table and notifies the sending end of the mapping table through negotiations or configuration. In a loopback measurement (for example, a loopback delay measurement), the sending end and the receiving end return through negotiations the GER key mapping table used for the packet. A pair of packets in a loopback may use different GER key classification modes, and the classification mapping is decided respectively by the sending end of each packet.

Mode 5: The UDP port ID field is used to carry the classification ID.

On a wireless transmission bearer network, the UDP packets account for most of the traffic. In this mode, when data packets are sent, different packet classifications use different port IDs. There may be three modes:

Using the source port ID; using the destination port ID; using the source port ID and the destination port ID at the same time.

The advantage of using the source port ID lies in that, the port ID is assigned by the local end and the uniqueness of the port ID can be ensured without negotiations with the peer end. However, the source IP address needs to be resolved at the IP layer of the receiving end. The classification measurement may be implemented during the port ID resolution. The detailed implementation is similar to Mode 1.

The mode that the second bit is 1 is used to evade the defined ports that are commonly used.

For an end-to-end measurement, the mapping table between the UDP port ID and the classification is unidirectional. Either the packet sending end or the receiving end may determine the mapping table and then notify the receiving end or the packet sending end of the mapping table. In a loopback measurement (for example, a loopback delay measurement), the sending end and the receiving end return through negotiations the UDP port ID mapping table used for the packet. A pair of packets in a loopback may use different UPD port ID classification modes and the classification mapping is decided respectively by the sending end of each packet.

As regards step 12:

The data streams are described above. During the measurement, the measurement contents and measurement modes need to be determined. One measurement corresponds to one measurement object, including the measurement contents, the data stream to be measured, and the measurement modes. One measurement object is assigned one ID. The valid field of the ID is an IP address pair having a direction. In the context of an IP address (such as a source IP address or a destination IP address) pair, the ID is unique. Two IP address pairs having different directions constitute two scopes. One ID may be used in two different directions. The source IP address, the destination IP address, and the measurement object ID may uniquely identify a measurement. One measurement may be jointly defined by the measurement object ID and a single measurement ID. The single measurement ID may be a timestamp or sequence number (SN), or the single measurement may carry no ID. The initiation to the end of a measurement message is regarded as one measurement. One measurement object may include multiple measurement contents. These contents have the same data stream to be measured. This means that one measurement may obtain multiple measurement results of multiple measurement contents.

As regards the measurement contents: Table 24 lists the definitions of the measurement contents.

TABLE 24

| Measurement Contents | Measurement Unit |
| --- | --- |
| End-to-end connectivity | (T/F) |
| End-to-end unidirectional delay, end-to-end loopback delay, end-to-end unidirectional delay jitter, and end-to-end loopback delay jitter | (μs) |
| End-to-end PLR | (%) |
| Number of end-to-end received bytes | (Byte) |

These specific definitions of the measurement contents may be referred to the terminology described previously. The measurement unit for the end-to-end connectivity is "T/F", which represents True/False, that is, the connectivity has two values, namely, success and failure. Item 8 in the measurement items is specifically pointed out here. According to the network model shown in FIG. 3, when the packets sent from the first endpoint pass through the network, the DSCP values in the packets may be modified when the packets pass through different DS fields. The IP network performance measurement and QoS control that are based on DiffServ are usually performed based on the DSCP value. Therefore, the end-to-end DSCP mapping needs to be known, so as to track the path through which the data packets pass.

The main idea of is that, the QoS control (packet loss, shaping, and route selection) is performed at the network access point and the network junction point according to the DSCP field.

Figure 5:
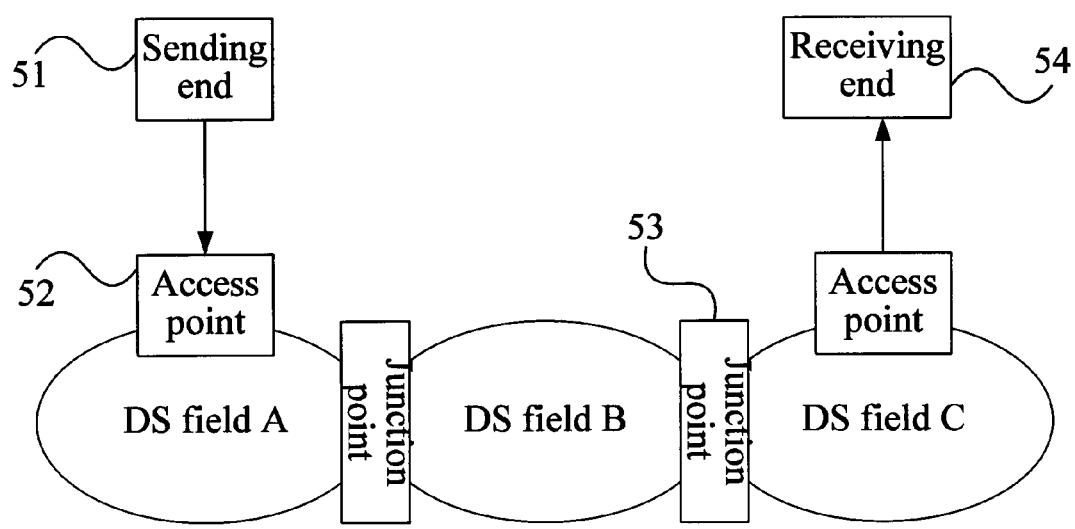
FIG. 5 is a schematic structural diagram of a network based on a DiffServ model according another embodiment of the present invention.

FIG. 5 is a schematic structural diagram of a network based on a DiffServ model according an embodiment of the present invention. Referring to FIG. 5, in this embodiment, three DS fields, namely, DS field A, DS field B, and DS field C are included. The three DS fields are connected through a junction point 53. A sending end 51 sends the data stream to be measured to the first DS field through an access point 52. Then, after the data stream to be measured pass through each DS field, the data stream to be measured arrive at a receiving end 54 through the access point 52. A brief process of the DiffServ mechanism is as follows: The sending end marks service streams of each service with different DSCP values according to different requirements for network QoS of different service types, and controls the QoS at the network access point and within the network. If the receiving end and the sending end are in different DS fields (for example, through multiple network operators or different network media), the DSCP value may be mapped at the DS field junction point. To be specific, the DSCP value may be modified according to the mapping relationship between the DSCP values of two DS fields so that different policies for QoS control are implemented in different DS fields. Therefore, the DSCP value is likely to change when the service flow passes through different DS fields.

Because of the variability of the DSCP value, a DSCP mapping table needs to be set up first when the classification criteria include the DSCP value. The process of setting up the DSCP mapping table is mainly based on a basic principle: The sending end forms a measurement packet for the DSCP value mapping. The same DSCP value is filled in the DSCP field (end-to-end changeable) in the IP header of this packet and the packet content (end-to-end unchanging) of this packet. After receiving this measurement packet, the receiving end compares the DSCP value in the IP header with the DSCP value in the packet content to obtain the mapping relationship therebetween.

Figure 6A:
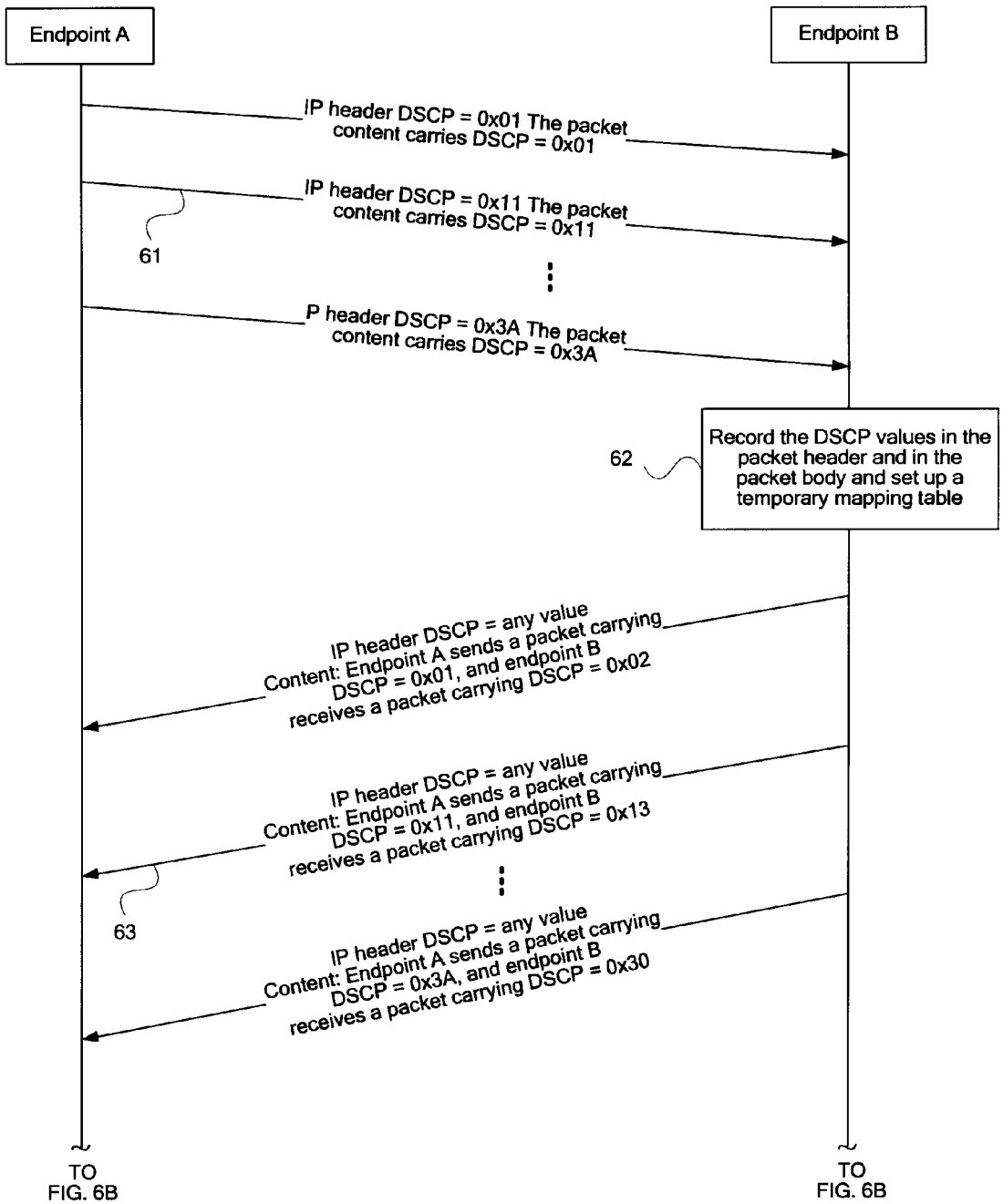
FIG. 6 is a schematic flow chart of a method for setting up an end-to-end unidirectional differentiated services code point (DSCP) mapping table according to another embodiment of the present invention.
Figure 6B:
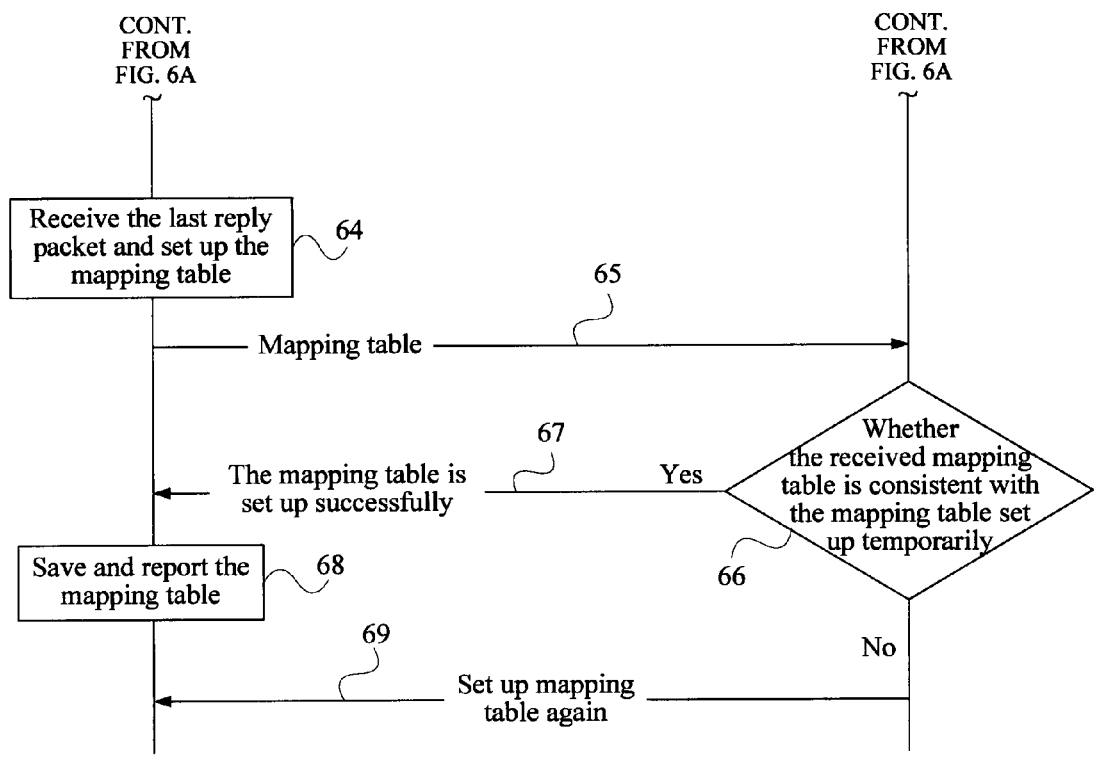

FIG. 6 is a schematic flow chart of a method for setting up an end-to-end unidirectional DSCP mapping table according to an embodiment of the present invention. The method includes:

Step 61: Endpoint A sends a mapping setup request packet to endpoint B, where the IP header and the packet content include the same DSCP value.

For example, DSCP=0x01, DSCP=0x11, and DSCP=0x3A.

Endpoint A sends a mapping setup request packet according to the mapping between its own service and the DSCP value. In this request, the DSCP value filled in the IP header is the same as the DSCP value in the packet content.

Step 62: Endpoint B receives the mapping setup request packet, records the DSCP value in the IP header of the received packet and the DSCP value in the packet content, and sets up a temporary DSCP value mapping relationship.

For example, DSCP=0x02, DSCP=0x13, and DSCP=0x30 in the IP header of the received packet.

Step 63: Endpoint B returns a mapping reply packet to endpoint A.

The DSCP field in the IP header of this reply packet may be filled with any DSCP value. The content of the reply packet partially carries the DSCP value of the packet sent by endpoint A and the DSCP value of the packet received by endpoint B. For example, DSCP=0x01 of the packet sent by endpoint A, and DSCP=0x0 2 of the packet received by endpoint B; DSCP=0x11 of the packet sent by endpoint A, and DSCP=0x13 of the packet received by endpoint B; DSCP=0x3A of the packet sent by endpoint A, and DSCP=0x30 of the packet received by endpoint B.

Step 64: Endpoint A sets up a mapping table after receiving the last reply packet.

Step 65: Endpoint A sends the mapping table that is set up to endpoint B.

Step 66: Endpoint B checks whether the mapping table sent by endpoint A is consistent with the temporary mapping table set up by Endpoint B. If the mapping tables are consistent, perform step 207; otherwise, perform step 209.

Step 67: Save the mapping table that is set up and return a successful setup message to endpoint A.

Step 68: Endpoint A saves the successfully set up mapping table and reports the mapping table further.

Step 69: Return a message requesting a re-setup of a mapping table to endpoint A.

The entire table entries may be set up again, or only one or several mapping items of the table entries may be indicated to be set up again.

The DSCP mapping table that is set up according to the preceding process of setting up the DSCP mapping table may be shown in Table 25 and Table 26.

TABLE 25

A→B Mapping Table

| Service Type | DSCP Value Sent by Endpoint A | DSCP Value Received by Endpoint B |
| --- | --- | --- |
| EF | 101110 | 101000 |
| AF4 | 100010 | 011000 |
| AF3 | 011010 | |
| AF2 | 010100 | 001000 |
| AF1 | 001010 | 000000 |
| BE | 000000 | |

TABLE 26

B→A Mapping Table

| Service Type | DSCP Value Sent by Endpoint B | DSCP Value Received by Endpoint A |
| --- | --- | --- |
| EF | 101110 | 101000 |
| AF4 | 100010 | 100000 |
| AF3 | 011010 | 010000 |
| AF2 | 010100 | |
| AF1 | 001000 | 000000 |
| BE | 000000 | |

As regards the data stream to be measured:

The data stream needs to be identified to ensure a correct measurement of IP network performance of different types of services. In this manner, the IP data stream which needs to be measured may be identified.

In addition, in the measurement contents listed in Table 24, some measurements may be implemented through dedicated measurement packets. For example, during a measurement delay, the sending end may send a packet having a specific feature, and the peer end measures only the delay of the packet. Some measurements need to measure service packets, for example, measure the PLR, and use the passive measurement mode to measure the unidirectional delay. At this time, different service packets need to be explicitly differentiated to accommodate measurements of different granularities.

As regards the measurement modes:

The measurement modes include a loopback measurement mode, a unidirectional measurement mode, and a passive measurement mode, and may further include a measurement period and a measurement direction.

In the loopback measurement mode, a first endpoint initiates a measurement and sends a measurement packet. The peer end (a second endpoint) returns local statistics information. The first endpoint collects the information and calculates the measurement results. This measurement mode applies to the measurement of "loopback" parameters or implementing the unidirectional measurement in a non-synchronization situation.

In the unidirectional measurement mode, the first endpoint initiates a measurement and sends a measurement packet; the peer end (the second endpoint) directly implements the measurement and sends the measurement result back to the first endpoint. This measurement mode applies to the measurement of unidirectional parameters (for example, PLR). Two unidirectional measurements may provide the measurement of loopback parameters.

The passive measurement is generally used for a connectivity measurement. The first endpoint periodically sends a measurement packet, and the second endpoint measures the measurement packet. If the second endpoint does not receive the measurement packet within a period of time, end-to-end connectivity between the first endpoint and second endpoint is considered to have failed. The connectivity in this embodiment refers to unidirectional connectivity, that is, A→B connectivity is different from B→A connectivity.

Three measurement modes are described above, where the measurement includes an associated measurement and an outband measurement. In the associated measurement, there is no special measurement packet. The measurement packet is attached to a generic service packet or measured directly using the service packet. In the outband measurement, an independently generated measurement packet is measured. The associated measurement and the outband measurement are behaviors of one end instead of end-to-end behaviors. To be specific, one end may perform the associated measurement, and the other end may perform the outband measurement. The preceding measurement modes (loopback, unidirectional, or passive measurement mode) and packet transmission mode (associated or outband mode) may be determined through pre-configuration or negotiations by the two ends, and may be randomly combined.

A basic network structure, basic conceptions, and measurement modes involved in the measurement are described above. Based on the preceding contents, as regards the specific measurement contents, the corresponding measurement process may include:

Measurement content one: end-to-end connectivity. An end-to-end connectivity measurement may be achieved using a loopback measurement mode or a passive measurement mode.

The end-to-end connectivity measurement only measures whether the connectivity is successful (F/T). The end-to-end connectivity measurement is based on a basic principle: If the packet having specific features is not received within a period of time, it can be deemed that the end-to-end connectivity from the local end to peer end is failed (note that it is unidirectional connectivity). The specific time range is determined by classification criteria, and relates to QoS assurance. The features of the specific packet are determined by the measurement object. For example, for a connectivity measurement of the IP layer, the IP packets that fail to be received (source IP address, destination IP address) within a specific period of time may be used as the judgment basis. The specific definition of the "features" may be referred to Table 1.

The packet having specific features may be a service packet directly measured or a packet having such specific features periodically sent by the peer end (generally called "heartbeat packet"). In order to prevent an error from occurring in the connectivity measurement in case of no services, the sending end periodically generates the heartbeat packet for the peer end to measure, or starts periodical sending of the heartbeat packet when no services exist on end-to-end connection having the specific features.

Figure 8:
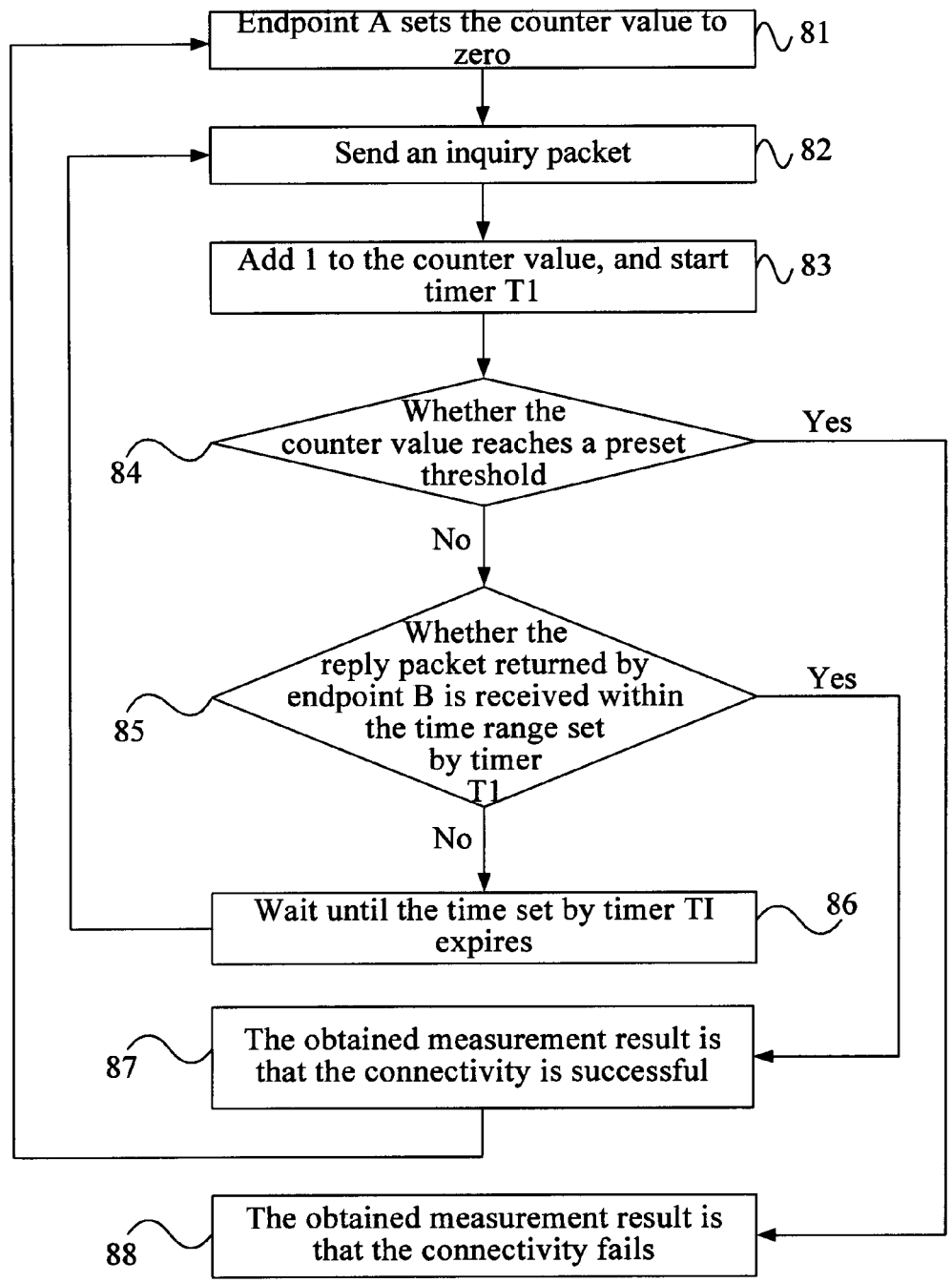
FIG. 8 is a schematic flow chart of a method for measuring end-to-end connectivity using a count judgment-based loop-back measurement mode according to another embodiment of the present invention.
Figure 9:
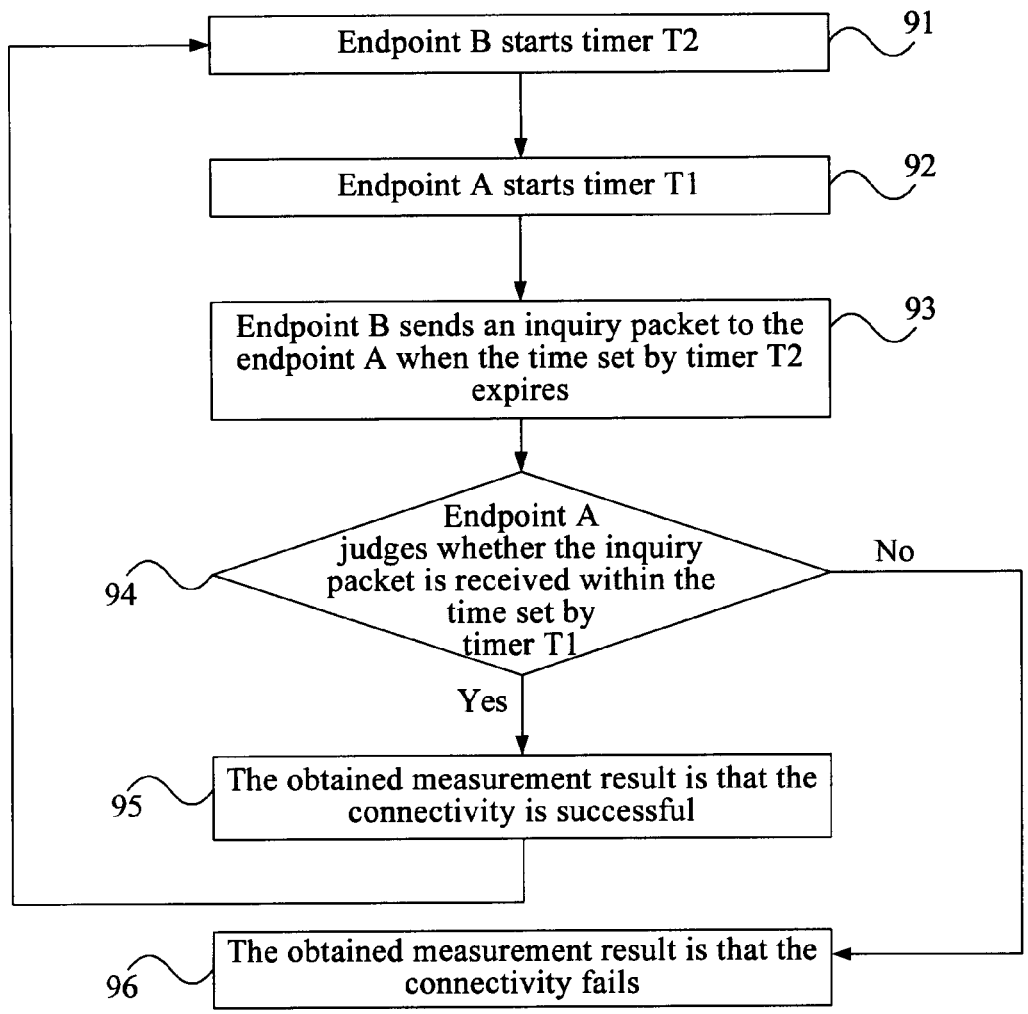
FIG. 9 is a schematic flow chart of a method for measuring end-to-end connectivity using a passive measurement mode according to another embodiment of the present invention.

There are two commonly-used modes for the connectivity measurement: a loopback measurement mode (referring to FIG. 7 and FIG. 8) and a passive measurement mode (referring to FIG. 9). The following uses a heartbeat packet (which may be an inquiry packet) as an example for illustration. It is understandable that, when a service packet having the specific features exists, a measurement may be directly performed on the service packet without generating the heartbeat packet.

A loopback mode refers to that one end initiates a connectivity measurement. After the peer end receives the packet, the peer end replies to the packet. The initiator end receives the reply packet and then determines that the connectivity of the connection (bidirectional: peer end↔local end) is successful (True). This embodiment does not limit that the two ends start the loopback measurement concurrently or only one end starts the loopback measurement. According to the judgment mode, the loopback measurement mode may be divided into a timing-based judgment mode or a count-based judgment mode. These two modes are detailed as follows.

Figure 7:
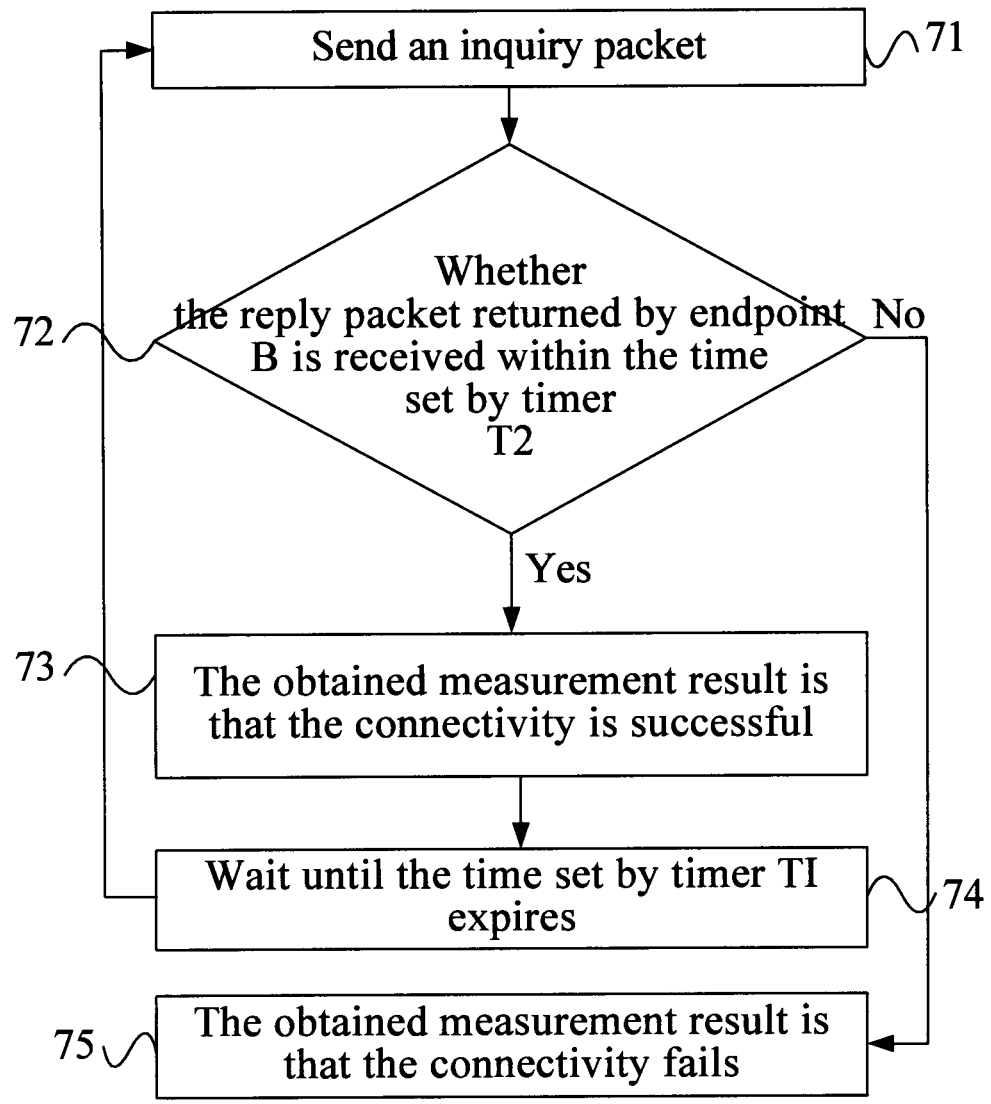
FIG. 7 is a schematic flow chart of a method for measuring end-to-end connectivity using a timing judgment-based loop-back measurement mode according to another embodiment of the present invention.

FIG. 7 is a schematic flow chart of a method for measuring end-to-end connectivity using a timing judgment-based loopback measurement mode according to an embodiment of the present invention. This embodiment is applied to a timing-based judgment system and is implemented after the following steps: Endpoint A, as an initiator end, sends a control packet for starting a measurement to endpoint B, where the control packet carries information indicating that the loopback measurement mode needs to be used to perform an end-to-end connectivity measurement for the data stream to be measured (a class of data streams) having specific features. Referring to FIG. 7, the method includes:

Step 71: Endpoint A sends an inquiry packet to endpoint B. This inquiry packet needs to carry specific features of the data stream to be measured. Meanwhile, endpoint A starts timer T1 and timer T2 (timer T1 and timer T2 may be preconfigured on the endpoint A side).

Timer T1 is a periodical timer, indicating the time of sending the inquiry packet next time; and timer T2 is a connectivity measurement timer, which is used to specify a time window for receiving a reply packet.

Step 72: Endpoint A determines whether the reply packet returned by the second endpoint is received within the time set by timer T2. If the reply packet is received within the time set by timer T2, perform step 73; otherwise, perform step 75.

Step 73: The measurement result obtained by endpoint A is that the connectivity is successful.

Step 74: Endpoint A waits until the time set by timer TI expires, and then step 71 is repeatedly performed.

Step 75: The measurement result obtained by endpoint A is that the connectivity fails.

FIG. 8 is a schematic flow chart of a method for measuring end-to-end connectivity using a count judgment-based loopback measurement mode according to an embodiment of the present invention. This embodiment is applied to a count-based judgment system and is implemented after the following steps: Endpoint A, as an initiator end, sends a control packet for starting a measurement to endpoint B, where the control packet carries information indicating that the loopback measurement mode needs to be used to perform an end-to-end connectivity measurement for the data stream to be measured (a class of data streams) having specific features. Referring to FIG. 8, the method includes:

Step 81: Endpoint A sets the counter value to zero.

Step 82: Endpoint A sends an inquiry packet to endpoint B. This inquiry packet needs to carry specific features of the data stream to be measured.

Step 83: Endpoint A adds 1 to the counter value, and starts timer T1 (Timer T1 may be preconfigured on the endpoint A side). Timer T1 is a periodical timer, indicating the time of sending the inquiry packet next time.

Step 84: Endpoint A determines whether the counter value reaches a preset threshold. If the counter value reaches the preset threshold, perform step 88; otherwise, perform step 85.

Step 85: Endpoint A determines whether the reply packet returned by the second endpoint is received within the time set by timer T1. If the reply packet is received within the time set by timer T1, perform step 87; otherwise, perform step 86.

Step 86: Endpoint A waits until the time set by timer T1 expires, and then step 82 is repeatedly performed.

Step 87: The measurement result obtained by endpoint A is that the connectivity is successful. Afterwards, repeatedly perform step 81.

Step 88: The measurement result obtained by endpoint A is that the connectivity fails.

The preceding two embodiments describe the end-to-end connectivity measurement in the loopback measurement mode. The following describes the end-to-end connectivity measurement in a passive measurement mode. It can be understood that during the connectivity measurement in the passive measurement mode, one of endpoint A and endpoint B serves as a sending end only and the other serves as a receiving end only.

FIG. 9 is a schematic flow chart of a method for measuring end-to-end connectivity using a passive measurement mode according to an embodiment of the present invention. This embodiment is implemented after the following steps: Endpoint A, as an initiator end, sends a control packet for starting a measurement to endpoint B, where the control packet carries information indicating that the passive measurement mode needs to be used to perform an end-to-end connectivity measurement for the data stream to be measured (a class of data streams) having specific features. Referring to FIG. 9, the method includes:

Step 91: Endpoint B starts timer T2 (which may be preconfigured on the endpoint A side).

Timer T2 is a periodical timer, indicating the time of sending the inquiry packet next time.

Step 92: Endpoint A starts timer T1 (which may be preconfigured on the endpoint A side). Generally, T1≥nT2, where n is a positive integer. Commonly, steps 91 and 92 may be completed synchronously.

Step 93: When the time set by timer T2 expires, endpoint B sends an inquiry packet to the endpoint A. This inquiry packet needs to carry specific features of the data stream to be measured.

Step 94: Endpoint A determines that the inquiry packet sent by endpoint B is received in the time set by timer T1. If the inquiry packet is received in the time set by timer T1, perform step 95; otherwise, perform step 96.

Step 95: The measurement result obtained by endpoint A is that the connectivity is successful.

Afterwards, repeatedly perform step 92. That is, the T1 set last time is first shut down and then a new T1 is restarted.

Step 96: The measurement result obtained by endpoint A is that the connectivity fails.

Measurement Content 2: an end-to-end unidirectional delay. The Measurement of the end-to-end unidirectional delay may be implemented using a unidirectional measurement mode, a passive measurement mode, or a loopback measurement mode.

The end-to-end unidirectional delay measurement is performed in two cases: 1. absolute time synchronization between two endpoints; 2. absolute time asynchronization between two endpoints.

Figure 10:
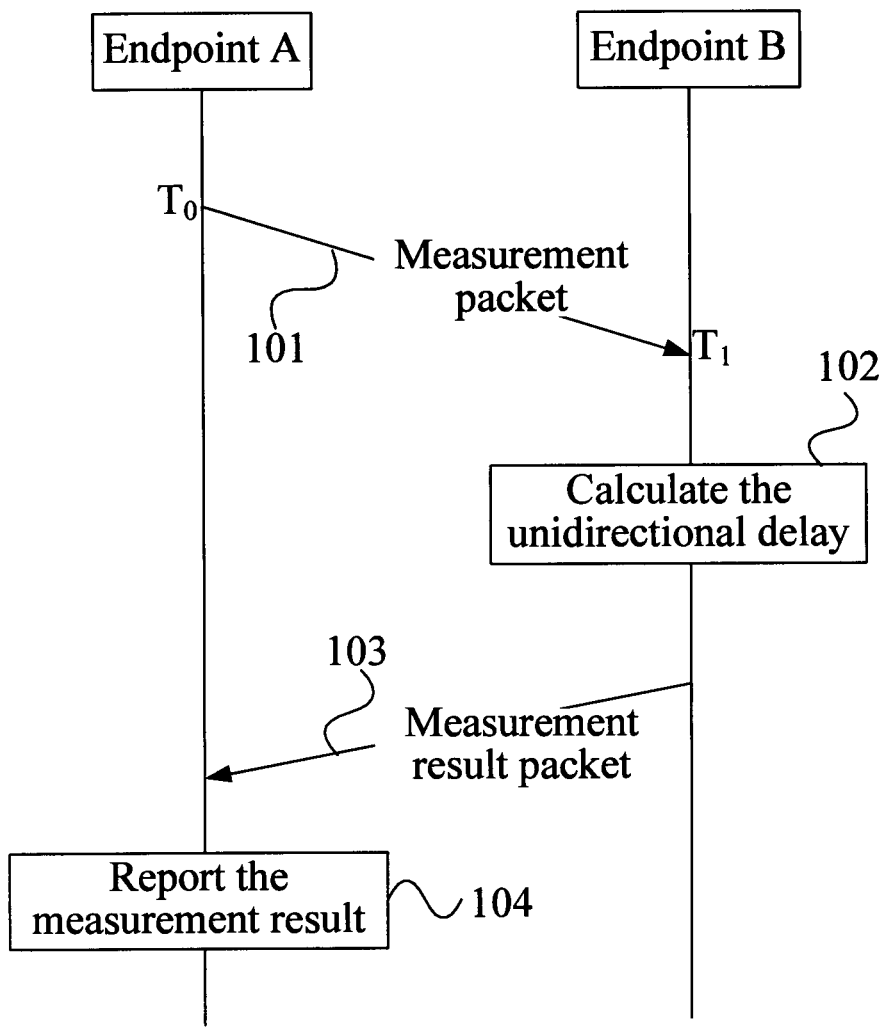
FIG. 10 is a schematic flow chart of a method for measuring an end-to-end unidirectional delay using a unidirectional measurement mode according to another embodiment of the present invention.

FIG. 10 is a schematic flow chart of a method for measuring an end-to-end unidirectional delay using a unidirectional measurement mode according to an embodiment of the present invention. This embodiment is implemented after the following steps: Endpoint A, as an initiator end, sends a control packet for starting a measurement to endpoint B, where the control packet carries information indicating that the unidirectional measurement mode needs to be used to perform an end-to-end unidirectional delay measurement for the data stream to be measured (a class of data streams) having specific features. Referring to FIG. 10, the method includes:

Step 101: A sending end A sends a unidirectional delay measurement packet at a time point $T_{10}$, where the packet carries the timestamp $T_{10}$ when the packet leaves the sending end.

Step 102: When receiving the unidirectional delay measurement packet, a receiving end B records the arrival time of the packet and calculates the unidirectional delay: $T_{unidirectionaldelay} = T_1 - T_0$.

Step 103: The receiving end carries the measurement result ($T_{unidirectionaldelay} = T_1 - T_0$) in a measurement result packet and sends the packet back to the sending end.

The identifier $T_0$ of this measurement may also be marked in the measurement result packet. Other modes, for example, the random number or SN, may be used to identify this measurement. In this case, both the measurement packet and the measurement result packet carry this identifier.

Step 104: Endpoint A reports the measurement result.

The unidirectional measurement mode applies to the time synchronization scenario. If the absolute time is not synchronized, but the absolute time difference between two endpoints is known, and the clock frequencies are consistent, a similar method may be used to correct the time at a first endpoint or a second endpoint. Then, the preceding solution may be used.

The end-to-end unidirectional delay applies to all classification criteria listed in Table 1. During the measurement of a specific granularity, a generated measurement packet needs to match the granularity definition of the measurement. For example, to measure the loopback delay having features (packet size=576, source IP address=A, destination IP address=B, and DSCP=0x3A), a 576-byte packet needs to be generated (A measurement packet may be generated, and the padding mode may be used to enable the size of the packet to be just 576 bytes), and DSCP value 0x3A is marked in the packet. This packet is sent from the port with a source IP address A of the local end, and the destination IP address is B. The measurement result packet may be sent back in different packet sizes and with different DSCP values. For example, the packet may be marked with the highest level of DSCP so that the measurement results have a more timely effect. Or, this effect may also be achieved if the DSCP priority of the measurement result packet is higher than the DSCP priority of the data stream to be measured. Or, when the return path is good, the DSCP value carried in the reply packet is the same as the DSCP priority carried in the data stream to be measured.

Figure 11:
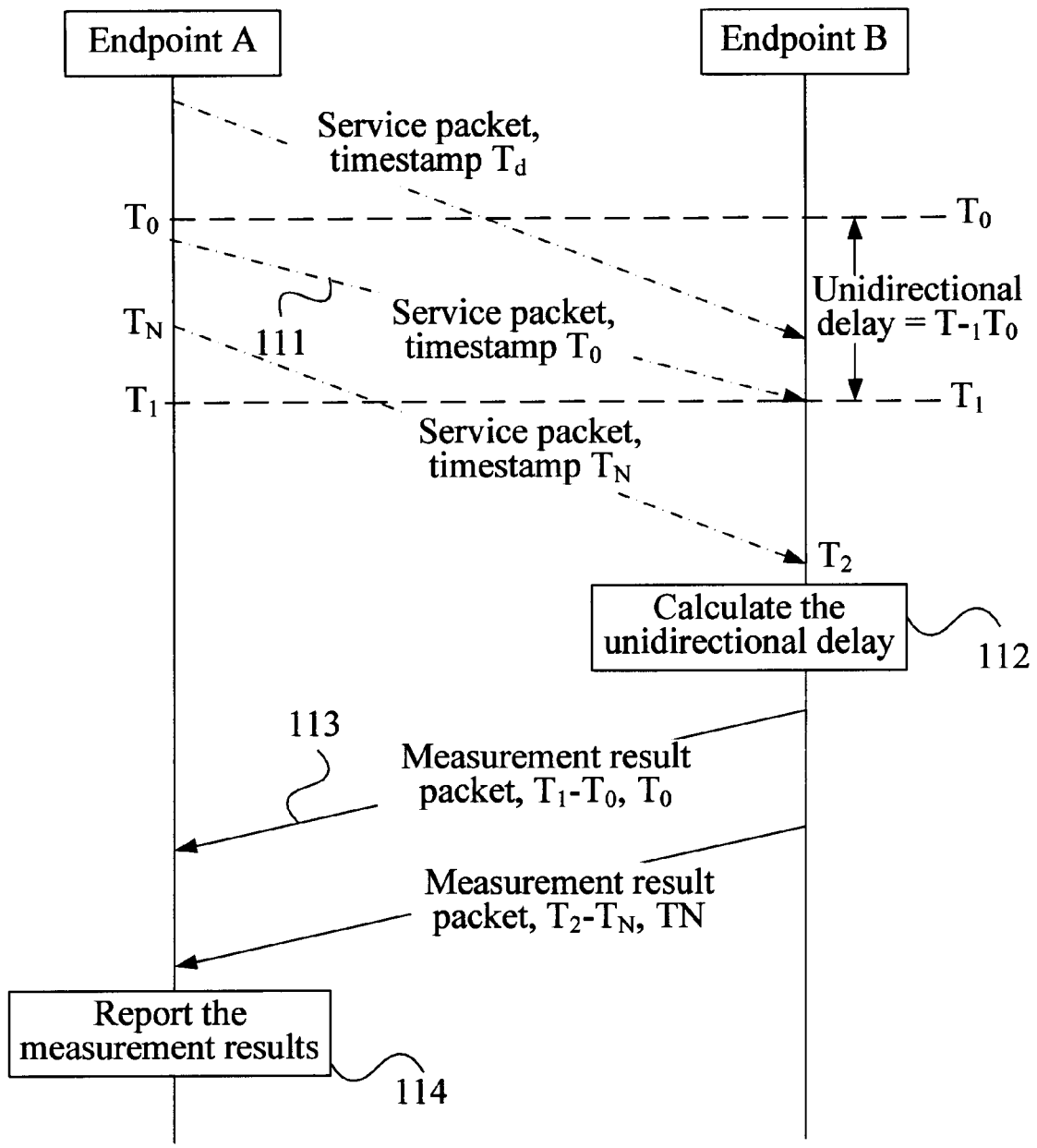
FIG. 11 is a schematic flow chart of a method for measuring an end-to-end unidirectional delay using a passive measurement mode according to another embodiment of the present invention.

FIG. 11 is a schematic flow chart of a method for measuring an end-to-end unidirectional delay using a passive measurement mode according to an embodiment of the present invention. The passive measurement mode also applies to the time synchronization scenario under the condition that the IP layer header or extended field of a service packet carries information about the absolute time. This embodiment is implemented after the following steps: Endpoint A, as an initiator end, sends a control packet for starting a measurement to endpoint B, where the control packet carries information indicating that the passive measurement mode needs to be used to perform an end-to-end unidirectional delay measurement for the data stream to be measured (a class of data streams) having specific features. Referring to FIG. 11, the method may specifically include:

Step 111: Endpoint A sends a unidirectional delay measurement packet to endpoint B, where the packet carries a timestamp.

For example, the initiator end A sends a unidirectional delay measurement packet at a time point $T_0$, where the packet carries the timestamp $T_0$ when the packet leaves the initiator end; and sends a unidirectional delay measurement packet at a time point $T_N$, where the packet carries the timestamp $T_N$ when the packet leaves the initiator end.

Step 112: When receiving the packet, endpoint B records the arrival time of the packet and calculates the unidirectional delay.

For example, $T_{unidirectionaldelay} = T_1 - T_0$, and $T_{unidirectionaldelay} = T_2 - T_N$.

Step 113: Endpoint B carries the unidirectional delay measurement result in a measurement result packet and sends the packet back to the initiator end, and the ID ($T_0$ or $T_N$) of this measurement may also be marked in the measurement result packet.

Step 114: Endpoint A reports the measurement result.

Figure 12:
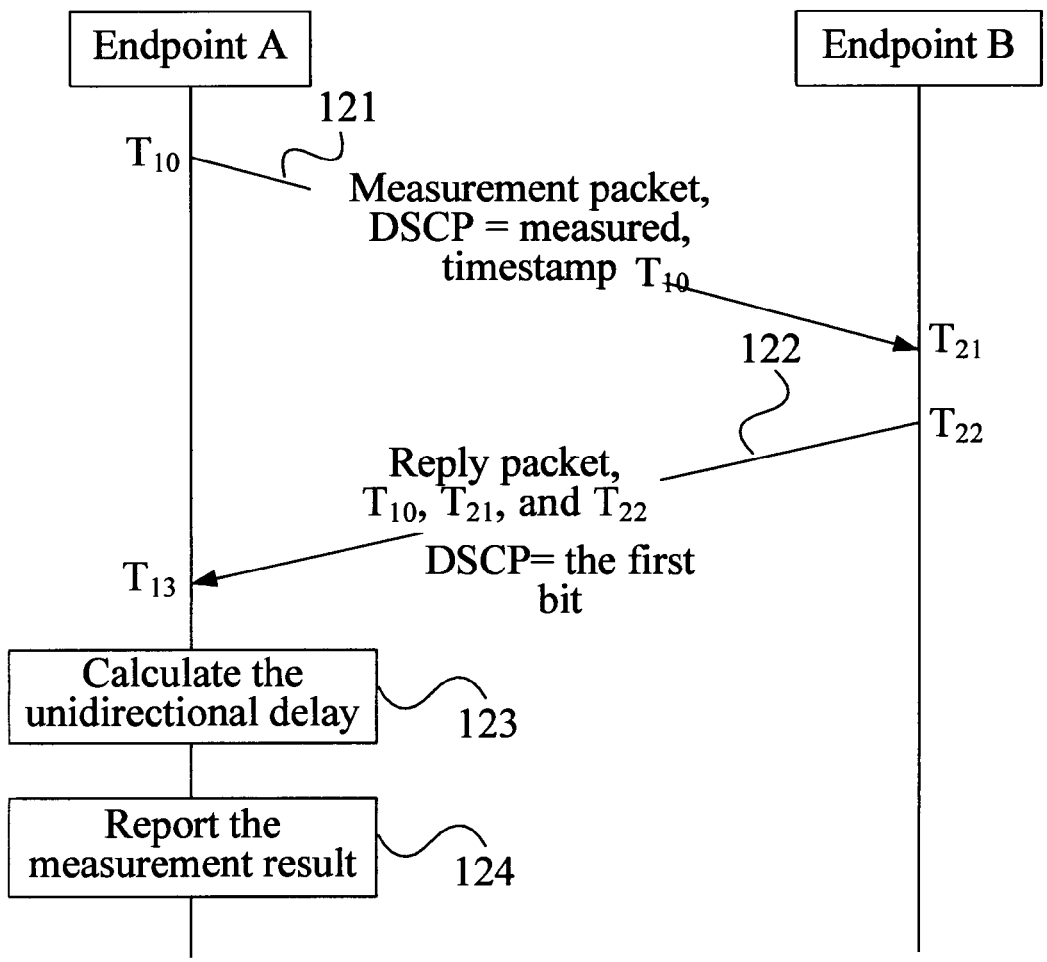
FIG. 12 is a schematic flow chart of a method for measuring an end-to-end unidirectional delay using a loopback measurement mode according to another embodiment of the present invention.

FIG. 12 is a schematic flow chart of a method for measuring an end-to-end unidirectional delay using a loopback measurement mode according to an embodiment of the present invention. The loopback measurement mode may apply to a measurement in case of time asynchronization between two endpoints. This embodiment is implemented after the following steps: Endpoint A, as an initiator end, sends a control packet for starting a measurement to endpoint B, where the control packet carries information indicating that the loopback measurement mode needs to be used to perform an end-to-end unidirectional delay measurement for the data stream to be measured (a class of data streams) having specific features. Referring to FIG. 12, the method may specifically include:

Step 121: Endpoint A sends a unidirectional delay measurement packet at a time point $T_{10}$, and fills in the DSCP field in the IP header of the measurement packet a DSCP value that is the same as the DSCP value carried in the data stream to be measured.

Step 122: Endpoint B records the time $T_{21}$ when the measurement packet is received and sends a reply packet at a time point $T_{22}$.

The reply packet includes the time point $T_{10}$ when the measurement packet leaves endpoint A, the time point $T_{21}$ when endpoint B receives the measurement packet, and the time point $T_{22}$ when the reply packet leaves endpoint B. The DSCP field value of the reply packet is marked with a DSCP having the highest priority. Or, the effect may also be achieved if the DSCP priority of the reply packet is higher than the DSCP priority of the data stream to be measured. Or, when the return path is good, the DSCP value carried in the reply packet is the same as the DSCP priority in the data stream to be measured.

Step 123: After receiving the reply packet, endpoint A records the time $T_{11}$ when the reply packet is received and calculates the relative unidirectional delay.

The calculation formula may be:

$$T_{relativeunidirectionaldelay} = \frac{(T_{13} - T_{10}) - (T_{22} - T_{21})}{2},$$

where $T_{13}$ is the time when endpoint A receives the reply packet.

Step 124: Endpoint A reports the measurement result.

Measurement content three: an end-to-end loopback delay.

Figure 13:
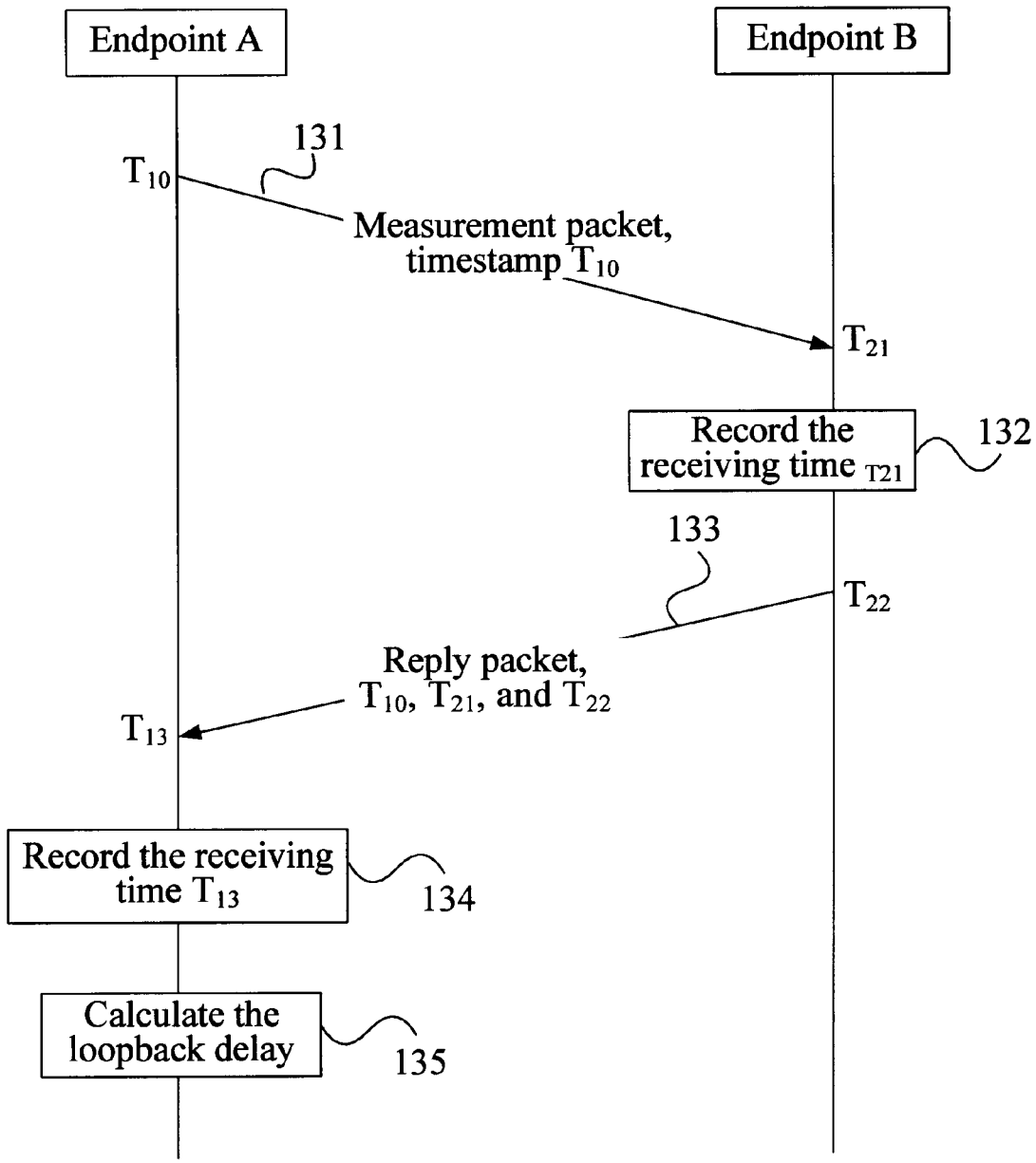
FIG. 13 is a schematic flow chart of a method for measuring an end-to-end loopback delay according to another embodiment of the present invention.

FIG. 13 is a schematic flow chart of a method for measuring an end-to-end loopback delay according to an embodiment of the present invention. This embodiment is implemented after the following steps: Endpoint A, as an initiator end, sends a control packet for starting a measurement to endpoint B, where the control packet carries information indicating that an end-to-end loopback delay measurement is required for the data stream to be measured (a class of data streams) having specific features. Referring to FIG. 13, the method includes:

Step 131: A first endpoint sends a loopback measurement packet to a second endpoint at a time point $T_{10}$, where the packet carries the timestamp $T_{10}$ when the packet leaves the first endpoint.

Step 132: The second endpoint receives the loopback measurement packet and records the time $T_{21}$ when the packet is received.

Step 133: The second endpoint sends a reply packet to the first endpoint, where the reply packet carries the time $T_{10}$ when the loopback measurement packet leaves the first endpoint, the time $T_{21}$ when the second endpoint receives the loopback measurement packet, and the time $T_{22}$ when the second endpoint sends the reply packet.

Step 134: The first endpoint receives the reply packet and records the time $T_{13}$ when the packet is received.

Step 135: The first endpoint calculates out the loopback delay.

The calculation formula may be: $T_{round-tripdelay} = (T_{13} - T_{10}) - (T_{22} - T_{11})$.

During the description of the measurement, $T_{1X}$ and $T_{2X}$ represent the time of the first endpoint and the second endpoint respectively, because the time of the first endpoint and that of the second endpoint may be asynchronous. The loopback delay measurement does not require absolute time synchronization between two endpoints, but requires that timing frequency synchronization achieves a certain precision.

The end-to-end loopback delay applies to all classification criteria listed in Table 1. During the measurement of a specific granularity, the generated measurement packet needs to match the granularity definition of the measurement. For example, to measure the loopback delay having features (packet size=576, source IP address=A, destination IP address=B, and DSCP=0x3A), a 576-byte packet needs to be generated (A measurement packet may be generated, and the padding mode may be used to enable the size of the packet to be just 576 bytes), and DSCP value 0x3A is marked in the packet. This packet is sent from the port with a source IP address A of the local end, and the destination IP address is B. Likewise, endpoint B sends the reply packet having the same size and the same DSCP value.

Then end-to-end loopback delay may be obtained through the method of adding "end-to-end unidirectional delays" in two directions. The details may be referred to the preceding measurement contents of the unidirectional delay. It is should be noted that, to ensure the real-time feature of the measurement results, this method of adding unidirectional delays requires smaller intervals between two measurements to be added.

FIG. 10, FIG. 11, FIG. 12 and FIG. 13 and corresponding embodiments achieve the delay measurement, and through the measurement based on delay, the delay jitter may be obtained.

Measurement content four: an end-to-end unidirectional delay jitter.

The end-to-end unidirectional delay jitter is a statistic for a unidirectional delay. A time range $(T_0, T_1)$ is defined and the unidirectional delay measurement is performed N times within this time range. The SN of obtained measurement results of the end-to-end unidirectional delay is that $t_i=(t_1, t_2, \ldots, t_N)$. Two unidirectional delay jitter metrics are defined as follows:

1. Peak jitter $T_p$: $T_p=\max(\{t_i\})-\min(\{t_i\})$; 2. weighted variance jitter $T_v$:

$$T_v = \sqrt{\sum_{i=1}^{N} w_i(t_i - t_{mean})^2},$$

where $$t_{mean} = \frac{1}{N}\sum_{i=1}^{N} t_i,$$

which is the mean of the end-to-end unidirectional delay; $w_i$ is a weighted value, that is, $$\sum_{i=1}^{N} w_i = 1,$$

which may be set according to the actual situations.

The peak jitter indicates the extreme value of the unidirectional delay within a defined time range, and the weighted variance jitter is a metric for a statistic mode. Weighting is generally used to adjust the weight of taking historical data into the statistics in collecting statistics with a long time range. If the time range $(T_0, T_1)$ is relatively short, all the weighted values may be set to 1 If the time range $(T_0, T_1)$ is relatively long, the weighted value of the delay with a long history may be set to be smaller than the weighted value of the recent delay to reflect the real-time jitter.

Measurement content five: an end-to-end loopback delay jitter.

The definition of the end-to-end loopback delay jitter is similar to that of the unidirectional delay jitter. That is, a time range $(T_0, T_1)$ is defined and the loopback delay measurement is performed N times within this time range. The SN of obtained measurement results of the end-to-end loopback delay is that $t_i=t_2, \ldots, t_N)$. The peak jitter $T_p$ and weighted variance jitter $T_v$ are calculated.

Measurement content 6: an end-to-end PLR.

For transport layer protocols with a confirmation mechanism, such as a TCP and a Stream Control Transmission Protocol (SCTP), the PLR may be calculated at the transport layer. For common packets, if the PLR statistics are performed under different granularities, specific measurement packets need to be used for PLR calculation.

The PLR may be measured in a loopback measurement mode, a unidirectional measurement mode, or a passive measurement mode.

Figure 14:
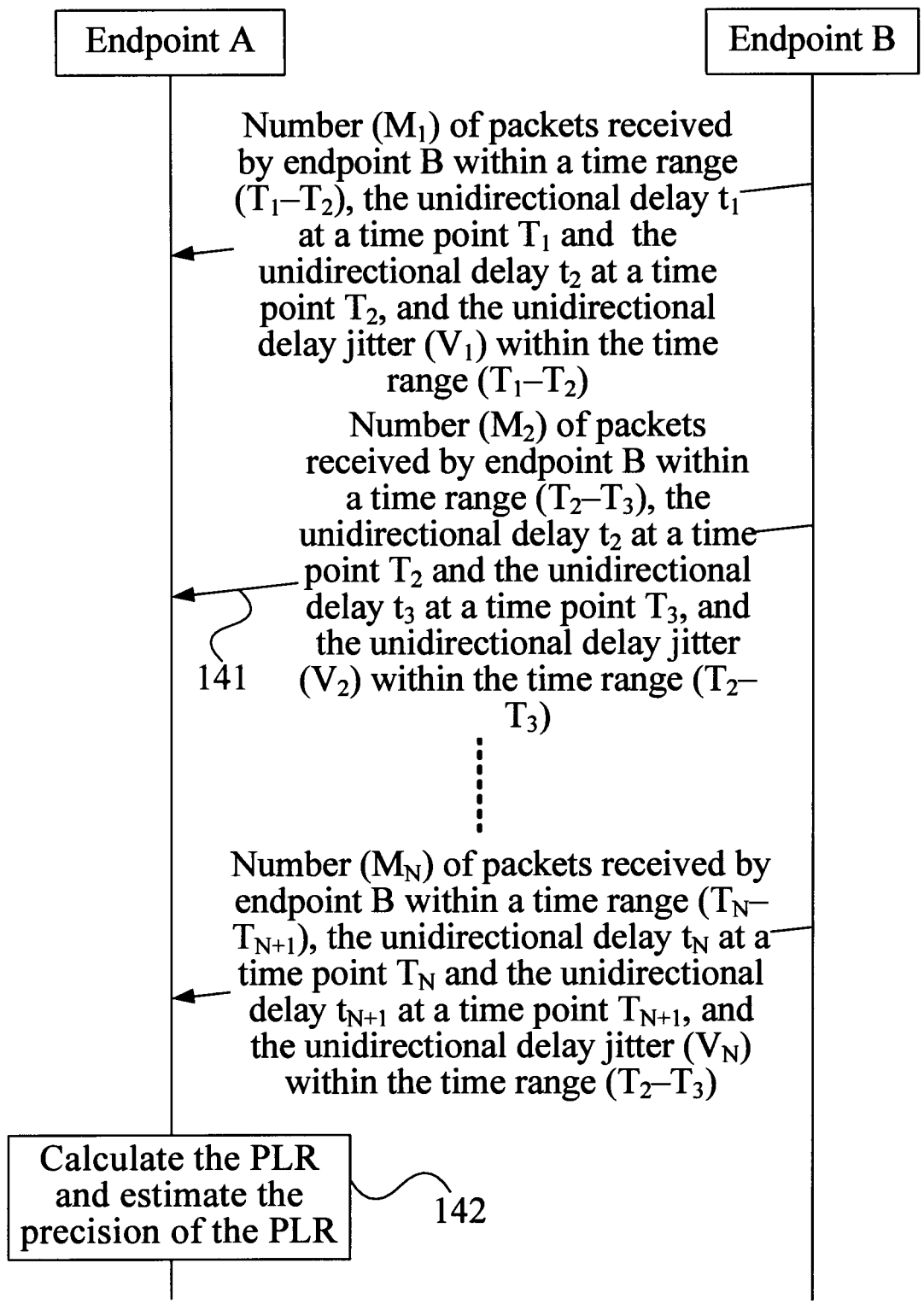
FIG. 14 is a schematic flow chart of a method for measuring an end-to-end packet loss ratio (PLR) using a passive measurement mode according to another embodiment of the present invention.

FIG. 14 is a schematic flow chart of a method for measuring an end-to-end PLR using a passive measurement mode according to an embodiment of the present invention. This embodiment is implemented after the following steps: Endpoint A, as an initiator end, sends a control packet for starting a measurement to endpoint B, where the control packet carries information indicating that the passive measurement mode needs to be used to perform an end-to-end PLR measurement for the data stream to be measured (a class of data streams) having specific features. Referring to FIG. 14, the method may specifically include:

Step 141: Endpoint B sends a PLR measurement packet to endpoint A, where the packet carries the number $(M_1)$ of packets received by endpoint B within a time range (for example, $T_1$-$T_2$), the unidirectional delays at time points (for example, $T_1$ and $T_2$) within this time range, and the unidirectional delay jitter $(V_1)$ within this time range.

Step 142: Endpoint A calculates out the PLR within the corresponding time range according to number of packets sent by endpoint A, the number of received packets carried in the PLR measurement packet, and the unidirectional delay values.

In addition, through the PLR measurement, the validity of the measurement results may be decided according to the delay and the delay jitter. If the delay jitter exceeds a threshold (configurable, for example, configured to be 30% of the length of the measurement period), the measurement is considered invalid. Specifically, the unidirectional delay jitter may be first obtained and then used to estimate the validity of the end-to-end PLR.

The preceding solution uses the "time range" as the PLR calculation unit. It can be understood that the SN may also be used for differentiation or separation. In this mode, the measurement results sent by endpoint B to endpoint A are: the number (M) of received packets within SN range of $S_1$-$S_2$, unidirectional delays of packet S1 and packet S2, and the unidirectional delay jitter within the interval of $S_1$-$S_2$. Likewise, the unidirectional delay jitter may also be obtained by endpoint A from the measurement results of the local end.

Figure 15:
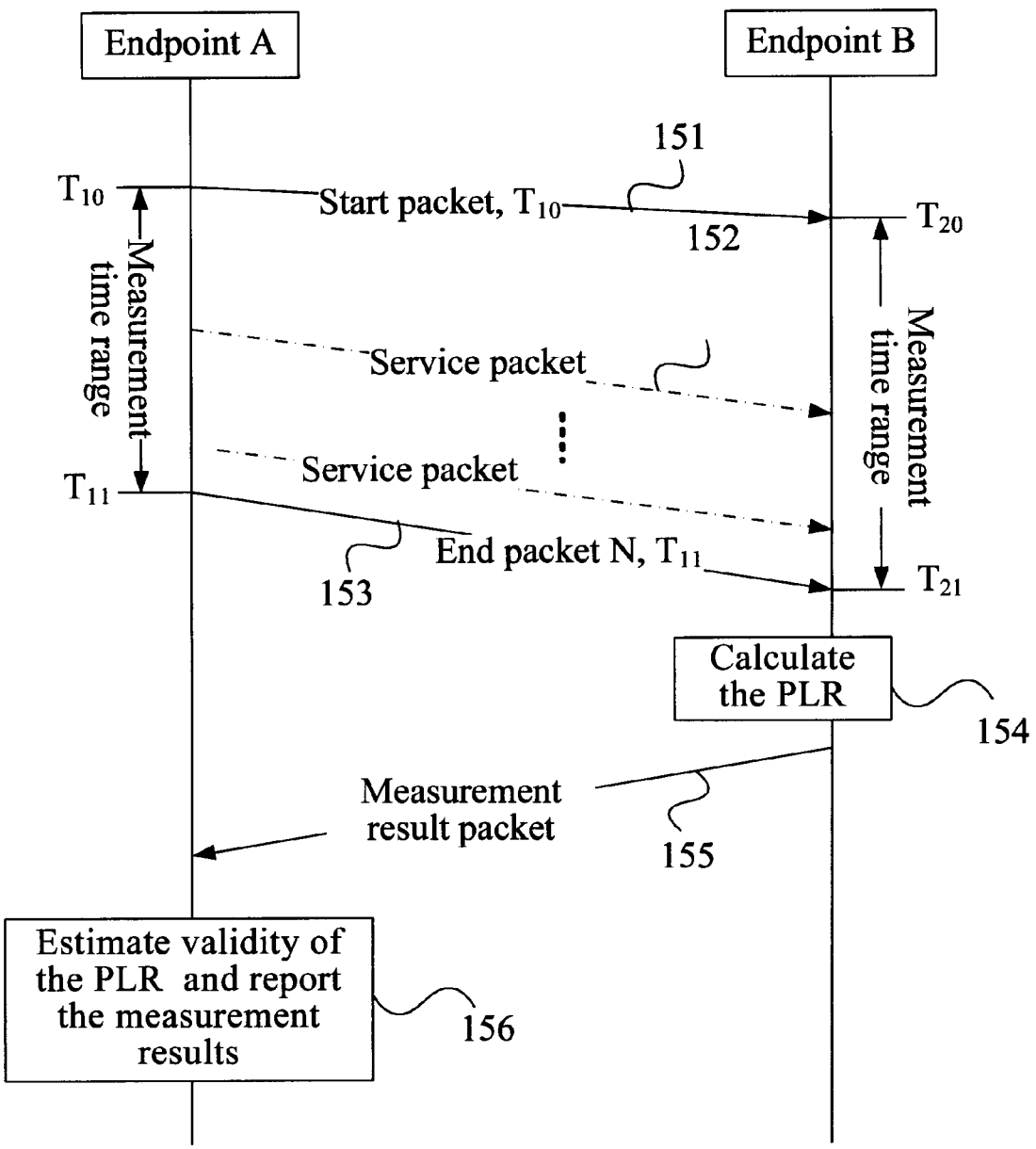
FIG. 15 is a schematic flow chart of a method for measuring an end-to-end PLR using a unidirectional measurement mode according to another embodiment of the present invention.

FIG. 15 is a schematic flow chart of a method for measuring a PLR using an end-to-end unidirectional measurement mode according to an embodiment of the present invention. This embodiment is implemented after the following steps: Endpoint A, as an initiator end, sends a control packet for starting a measurement to endpoint B, where the control packet carries information indicating that the unidirectional measurement mode needs to be used to perform an end-to-end PLR measurement for the data stream to be measured (a class of data streams) having specific features. Referring to FIG. 15, the method may specifically include:

Step 151: Endpoint A sends a start packet at a time point $T_{10}$, where the start packet carries the time $T_{10}$ when the start packet is sent.

The measurement time range of endpoint A is $T_{10}$-$T_{11}$, and the measurement period of endpoint B is $T_{20}$-$T_{21}$. The measurement time ranges may be preconfigured at the corresponding endpoints.

Step 152: Endpoint A sends a service packet of an IP data stream to be measured to endpoint B.

It can be understood that, endpoint A may generate a packet that has the specific features of the data stream to be measured and is dedicated to the measurement when no service packets exist.

Step 153: Endpoint A sends an end packet to endpoint B at a time point $T_{11}$, where the end packet carries the number (N) of packets sent by endpoint A within a time range $T_{10}$-$T_{11}$ and the time point $T_{11}$.

Step 154: Endpoint B counts the number of received packets within a time range $T_{20}$-$T_{21}$ and calculates the PLR $$1 - \frac{M}{N}.$$

Step 155: Endpoint B returns a measurement result packet to endpoint A, where the packet carries the PLR $$1 - \frac{M}{N}$$

and the unidirectional delay jitter v.

Step 156: Endpoint A may estimate the validity of the PLR according to the delay jitter value and reports the measurement results.

The technical solutions provided in embodiments of the present invention are based on the identifier packet (that is, measuring the PLR of service packets between the start packet and the end packet). With the technical solutions, the start packet and the end packet in the PLR measurement are configured to be the same streams as the measured service streams. To be specific, in the measurement mode shown in FIG. 15, the start packet and the end packet having the same features as the service packets are constructed. For example, to measure the PLR of a packet (whose packet size=576, source IP address=A, destination IP address=B, and DSCP=0x3A), the start packet and the end packet that are used need to meet conditions: packet size=576, source IP address=A, destination IP address=B, and DSCP=0x3A. It can be understood that the smaller the granularity is, the higher the measurement precision of the PLR is. A smaller granularity may be used in the measurement and then the sum of the PLRs is calculated, to obtain the amount of packet loss with a large granularity. It can be meanwhile seen that the measurement mode to be used is related to the network conditions and QoS assurance policy, which may be configured according to the actual situations in the practical implementation.

FIG. 14 and FIG. 15 are based on the basic fact that the "orderly delivery" of a service is not assured at the IP layer, assuming that the IP data packets carry no information about the packet sending sequence. If the data packets at the IP layer carry the information about the packet sending sequence, the accuracy and precision of the PLR measurement may be improved using the information.

The time or sequence information that may be used at the IP layer includes the following several types: 1. an IP layer timestamp option; 2. a packet ID in the IPv4; 3. an IPsec SN; 4. a TCP packet SN; 5. an SCTP transmission sequence number (TSN).

In addition, if the measurement is performed after fragmentation and before packaging packets, for example, at the end-to-end measurement and control point 4 shown in FIG. 4, the fragmentation offset (FO) needs to be included.

This embodiment uses the preceding Modes 1-3 as examples for descriptions.

Figure 16:
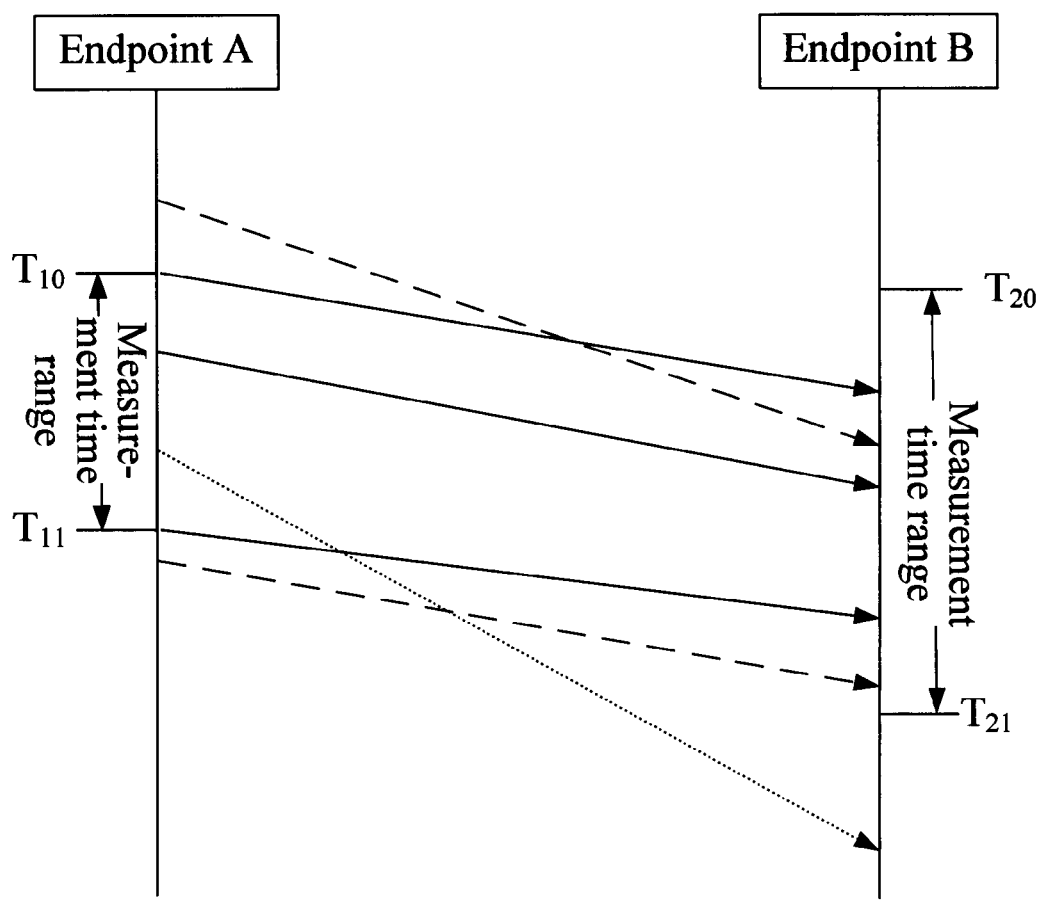
FIG. 16 is a schematic flow chart of a method for ensuring a sequence for sending data packets using a timestamp mode according to another embodiment of the present invention.

FIG. 16 is a schematic flow chart of a method for ensuring a sequence for sending data packets using a timestamp mode according to an embodiment of the present invention. The timestamp option in the IPv4 header is used to record information about the time when the packet is forwarded in the router. Specifically, the sending end uses the timestamp option in the IP header of each data packet and marks the time when the packet leaves the local end. The format used is shown in Table 27.

TABLE 27

| Type = 68 TimeStamp | Length = 8 | Pointer = 9 | oflw = 1 | Flag = 0 |
|---|---|---|---|---|

"type = 68" occupies byte 0,
"Length = 8" occupies byte 1,
"Pointer = 9" occupies byte 2,
"oflw = 1" occupies byte 3, and
"Flag = 0" occupies byte 3.

The timestamp field is filled with the local time when the packet leaves the local end. The setting of other fields enables the router to be free of further processing on this option (except adding 1 to the oflw field).

Each service packet is identified when the timestamp option is used to identify the packet. During the measurement, the arrival rate of the packets with a timestamp marked in a specific time range is only measured. The details are as shown in FIG. 16.

Referring to FIG. 16, measurement endpoint A sends the PLR in a time range ($T_{10}$, $T_{11}$) to endpoint B. Endpoint A, in the measurement time range, marks each service packet with a timestamp. Endpoint B, based on the estimated end-to-end unidirectional delay, sets a time window ($T_{20}$, $T_{21}$) for receiving the packet. In order to increase the measurement precision when the packet arrives in disorder, the time window ($T_{20}$, $T_{21}$) for receiving the packet is generally set to be greater than the length of the time range ($T_{10}$, $T_{11}$) for sending the packet. Only the packets (shown by solid lines) with a timestamp marked in ($T_{10}$, $T_{11}$) are counted towards the number of received packets. It can be seen that, the packets (shown by broken lines) sent before $T_{10}$ or after $T_{11}$ are not counted towards the number of the received packets. Meanwhile, a packet with a great delay, even if the packet is sent in the measurement time range, may fail to be counted towards the number of the received packets (shown by dotted lines).

Figure 17:
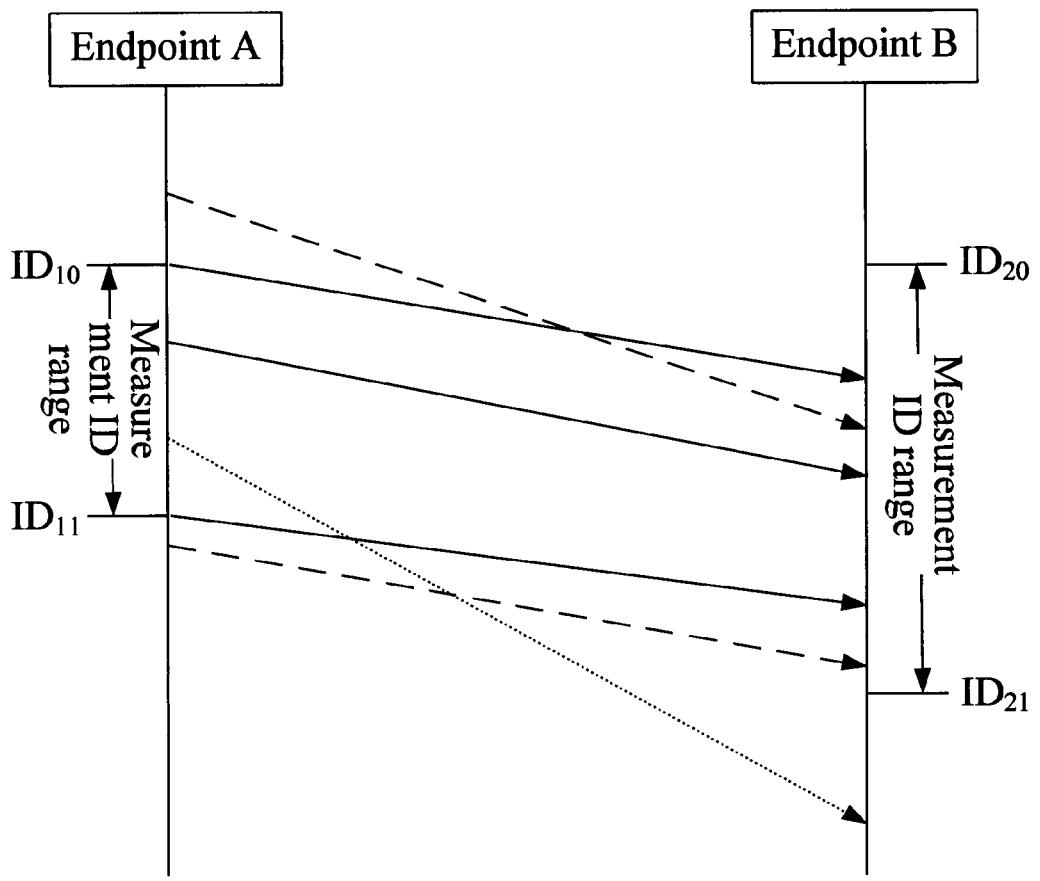
FIG. 17 is a schematic flow chart of a method for ensuring a sequence for sending data packets using an IPv4 header ID mode according to another embodiment of the present invention.

FIG. 17 is a schematic flow chart of a method for ensuring a sequence for sending data packets using an IPv4 header ID mode according to an embodiment of the present invention.

The ID field in the IPv4 header is used to uniquely identify an IP packet within a time range. The field is mainly used to correctly separate fragments of different IP packets during fragmentation and recombination. The length of the ID field is 16 bits, and 65536 packets are identified at most. If ID of each packet is generated in a suitable mode, the ID may be used at the receiving end as a measurement window to perform the measurement. The simplest way is to set an accumulator. The sending end adds 1 to the accumulator value each time the sending end sends a packet. This real-time value of the accumulator is directly used as the packet ID. In practice, with such a setting, the packet ID is equivalent to the packet SN. The ID size directly identifies the sequence of sending the data packets. (The situations in case of overflows need to be noted.) The receiving end directly uses the packet ID as the ID of the receiving measurement window and only measures the packets having IDs within a specific range during a measurement. Endpoint A and endpoint B may negotiate the IDs of the start and the end for the measurement time window, or may also regard the receiving of the packet having ID 1 as the start of the measurement and regard the receiving of the packet having ID 2 later as the end of the measurement.

Similar to FIG. 16, in this mode, the sending end and the receiving end negotiate the IDs of the start and the end; and the receiving measurement window of the receiving end is larger than the sending window in the measurement (using the ID as the IDs of the start and end of the window). This method may be implemented in combination with the method for identifying the data stream to be measured using IPv4 header IDs so as to achieve a multi-granularity measurement.

In FIG. 17, only the packets (shown by the solid lines) having IDs in ($ID_{10}$, $ID_{11}$) are counted towards the number of received packets. It can be seen that, the packets (showed by the broken lines) sent before $ID_{10}$ or after $ID_{11}$ are not counted towards the number of the received packets. Meanwhile, a packet with a great delay, even if the packet is sent in the measurement time range, may fail to be counted towards the number of the received packets (shown by the dotted lines).

Figure 18:
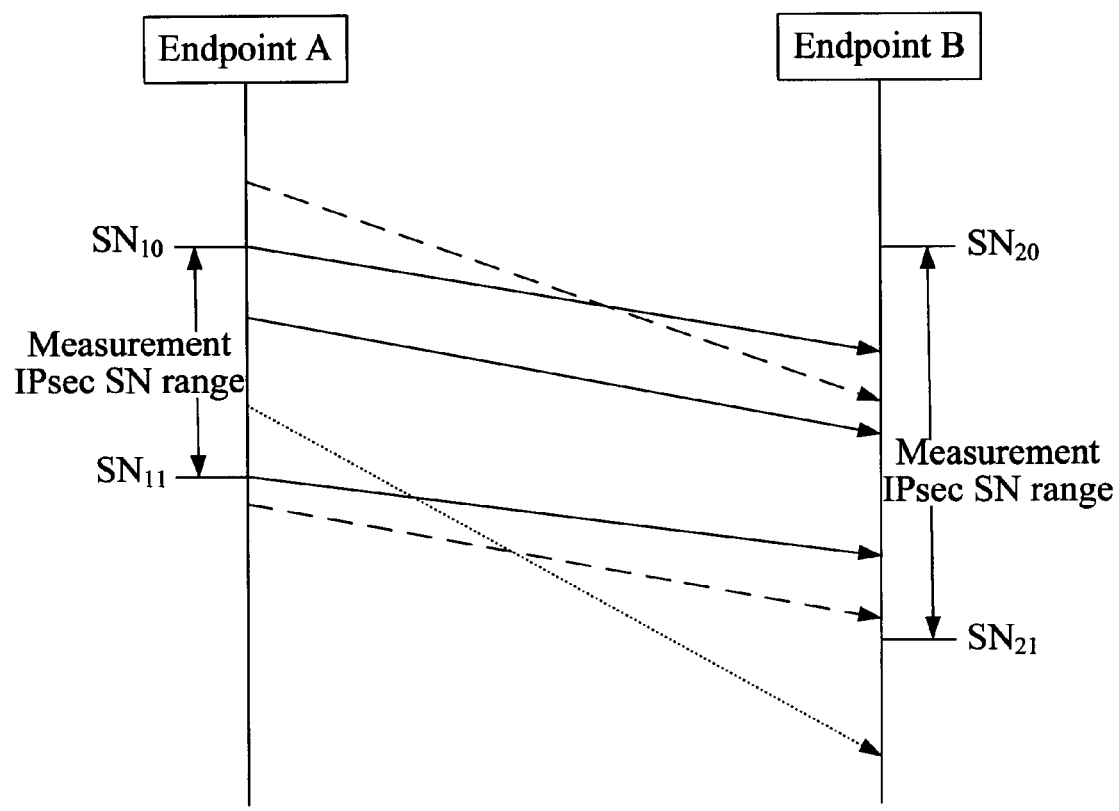
FIG. 18 is a schematic flow chart of a method for ensuring a sequence for sending data packet using an IP security (IPsec) serial number (SN) mode according to another embodiment of the present invention.

FIG. 18 is a schematic flow chart of a method for ensuring a sequence for sending packets using an IPsec SN mode according to an embodiment of the present invention. What is different from the method in FIG. 17 is that, in FIG. 18, IPsec SN is used to replace the ID in FIG. 17.

When IPsec is used as a transmission security mechanism, a mechanism of anti-replay attacks is provided. The anti-replay attacks implement "SN" identification in each SA. The length of the SN is 32 bits. Each time a packet is sent, the SN is increased by 1. The IPsec SN is used to achieve the measurement window similar to that for the IP header ID. The IPsec SN is independently generated by each SA and the length is 32 bytes. Therefore, the possibility of repeated SNs is very small. This method may be implemented in combination with the method for identifying the data stream to be measured using the IPsec SN, so as to achieve a multi-granularity measurement.

Measurement contents 7: the number of end-to-end received bytes.

The measurement of the number of end-to-end received bytes is similar to the measurement of the PLR. The difference is that the packet returned by endpoint B carries the number of received bytes in a measurement time range and also carries this measurement time range, instead of the PLR or the number of received packets. According to the information, endpoint B may further calculate a byte loss ratio (BLR) or estimate the network bandwidth.

The number of end-to-end received bytes may be measured using a measurement mode similar to the measurement modes in FIG. 14 and FIG. 15. The contents of the report only need to be changed to include the following fields: the counting start time, the counting end time, the number of received bytes in the measurement time range, and the unidirectional delay jitter in the measurement time range. In addition, similar to the PLR measurement, through the measurement of the number of received bytes, the validity of the measurement result may be decided according to the delay and delay jitter. If the delay jitter exceeds a threshold (which is configurable, for example, configured to be 30% of the length of the measurement time range), the measurement is considered invalid. Specifically, the unidirectional delay jitter may be first obtained and then used to estimate the validity of the number of end-to-end received bytes.

Figure 19A:
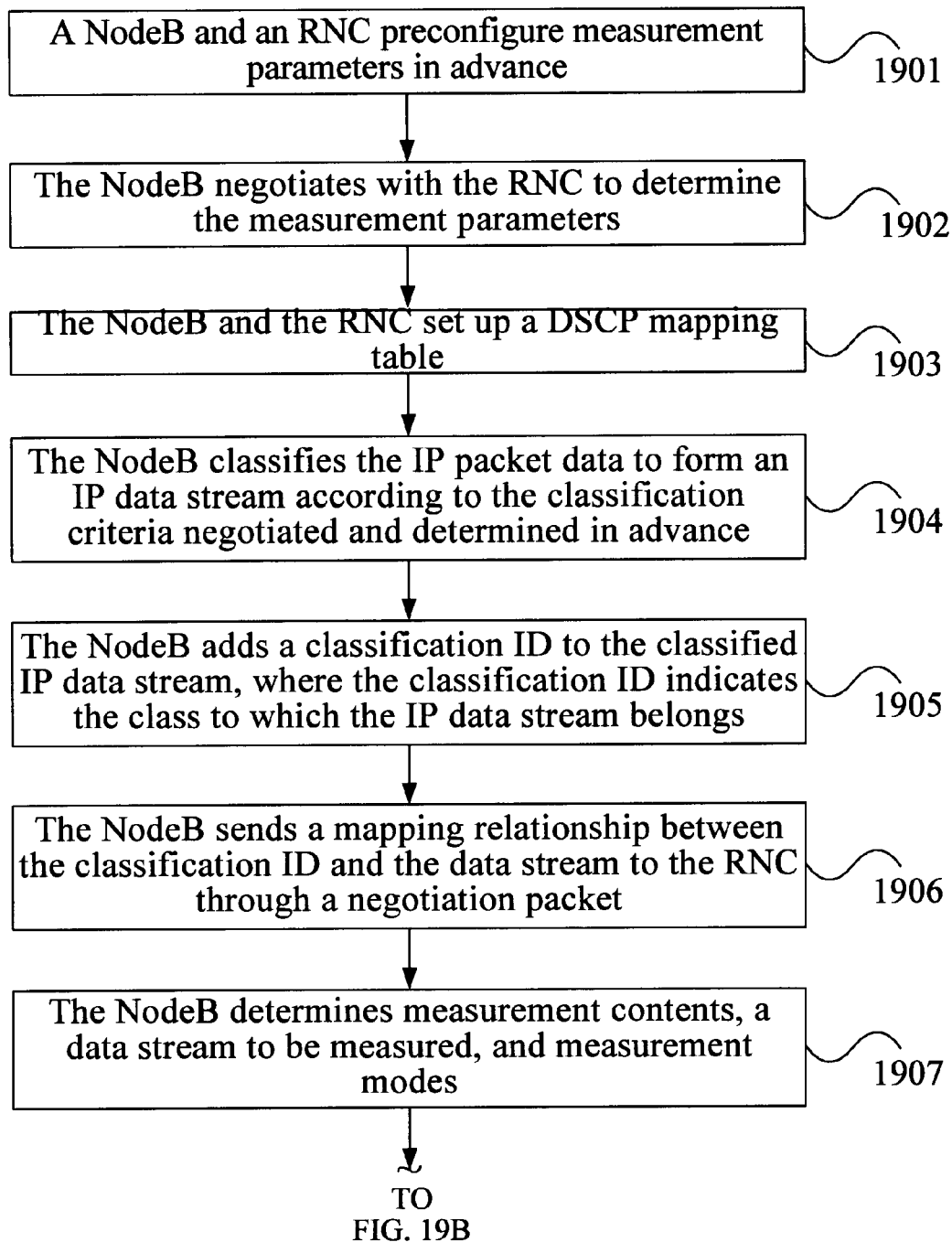
FIG. 19 is a schematic flow chart of a method according to another embodiment of the present invention.
Figure 19B:
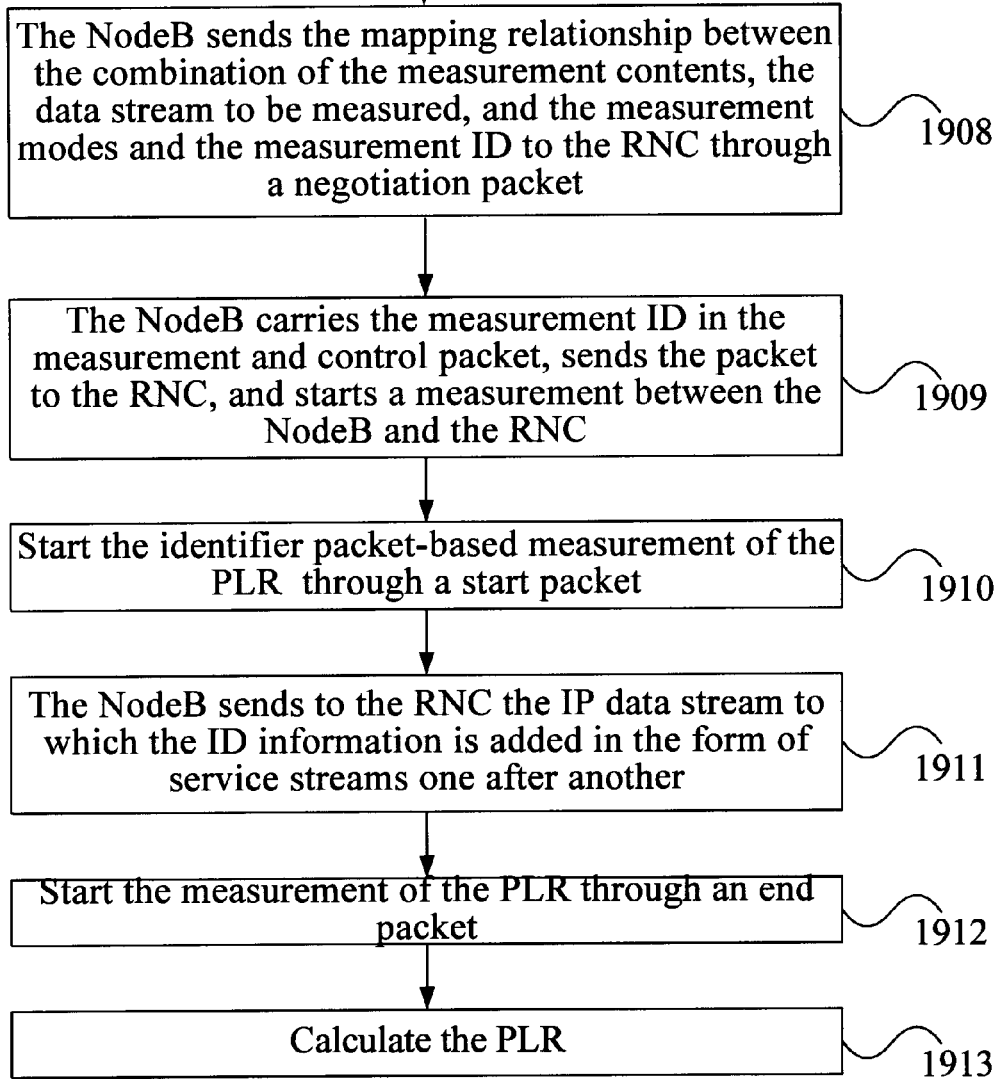

FIG. 19 is a schematic flow chart of a method according to another embodiment of the present invention. In this embodiment, a wideband code division multiple access (WCDMA) system is used as an example for illustration. Two endpoints are respectively a NodeB and a radio network controller (RNC). The direction NodeB→RNC is upstream, and the direction RNC→NodeB is downstream. The NodeB may be configured with two IP addresses, namely, N1 and N2 respectively; and the RNC may be configured with two IP addresses, namely, R1 and R2. The NodeB and the RNC are configured with two IP address pairs, namely, {N1, R1} and {N2, R2}. In this embodiment, two IP address pairs to be measured and controlled are directional, and the end-to-end IP connection to be measured and controlled is (N1, R1), (R1, N1), (N2, R2), and (R2, N2). Each endpoint is configured with two IP addresses for the purpose of a flow splitting or an active/standby switchover. It can be understood that each endpoint may be configured with one or more IP addresses.

Referring to FIG. 19, this embodiment includes:

Step 1901: A NodeB and an RNC preconfigure measurement parameters.

Before the NodeB and RNC are started, the following measurement parameters may be respectively configured at the local end: 1. measurement contents supported at the local end; 2. measurement modes supported by the measurement contents at the local end; 3. classification criteria (or called measurement granularities) supported at the local end; 4. a measurement time range supported at the local end (optional); 5. a threshold table supported at the local end (optional). For the preceding parameters 1-4, two sets of these parameters are usually configured. One set is used for the measurement initiated by the local end, and the other set is used to respond to the measurement supported by the peer end.

Step 1902: The NodeB negotiates with the RNC to determine the measurement parameters.

After the NodeB and RNC are started, the measurement parameters need to be negotiated, specifically, for example, 1. measurement contents, where the measurement contents determined through negotiations in the embodiment are connectivity, a unidirectional delay and a PLR; 2. measurement modes supported by the measurement contents at the local end, where the measurement modes determined through negotiations in this embodiment include a loopback measurement mode, a unidirectional measurement mode and a passive measurement mode; 3. classification criteria, where the classification criteria determined through negotiations in this embodiment include an IP packet data size, a source IP address, a destination IP address, and a DSCP value. In addition, the measurement period may also be negotiated.

In addition, the NodeB and the RNC may negotiate a DSCP mapping table, for example, there are four DSCP mapping tables, namely, N1→R1, R1→N1, N2→R2, and R2→N2 respectively.

In this embodiment, because the DSCP value is used in the classification criteria, in this case, a DSCP mapping table needs to be set up first. It can be understood that, when the DSCP value is not needed in the classification criteria, the DSCP mapping table does not need to be set up. When other information is needed in the classification criteria, the other information needs to be negotiated and determined.

However, during the specific negotiation process, the initiator end is the primary party. The initiator end carries the measurement parameters in a negotiation packet and sends the packet to the receiving end. If the receiving end supports the negotiation packet, the packet is directly received; otherwise, the receiving end sends a reply that the negotiation packet is not supported and recommends other parameters supported by the receiving end, and then the initiator end initiates a next negotiation.

Step 1903: The NodeB and the RNC set up a DSCP mapping table.

The NodeB and the RNC may respectively set up four end-to-end unidirectional mapping tables, corresponding to (N1, R1), (R1, N1), (N2, R2), and (R2, N2) respectively. The method for setting up the DSCP mapping table may be referred to the descriptions in FIG. 20, which is not repeatedly described here.

As an example, it is assumed that the DSCP mapping tables that are set up are shown in FIG. 28, FIG. 29, FIG. 30, and FIG. 31.

TABLE 28

N1→R1 Mapping Table

| Service Type | DSCP Value Sent by N1 | DSCP Value Received by R1 |
|---|---|---|
| EF | 101110 | 101000 |
| AF4 | 100010 | 011000 |
| AF3 | 011010 | |
| AF2 | 010100 | 001000 |
| AF1 | 001010 | 000000 |
| BE | 000000 | |

TABLE 29

R1→N1 Mapping Table

| Service Type | DSCP Value Sent by R1 | DSCP Value Received by N1 |
|---|---|---|
| EF | 101110 | 101000 |
| AF4 | 100010 | 100000 |
| AF3 | 011010 | 010000 |
| AF2 | 010100 | |
| AF1 | 001000 | 000000 |
| BE | 000000 | |

TABLE 30

N2→R2 Mapping Table

| Service Type | DSCP Value Sent by N2 | DSCP Value Received by R2 |
|---|---|---|
| EF | 101110 | 101000 |
| AF4 | 100010 | 011000 |
| AF3 | 011010 | |
| AF2 | 010100 | 001000 |
| AF1 | 001010 | 000000 |
| BE | 000000 | |

TABLE 31

R2→N2 Mapping Table

| Service Type | DSCP Value Sent by R2 | DSCP Value Received by N2 |
|---|---|---|
| EF | 101110 | 100000 |
| AF4 | 100010 | |
| AF3 | 011010 | 010000 |
| AF2 | 010100 | |
| AF1 | 001000 | 000000 |
| BE | 000000 | |

The preceding steps 1901-1903 may be understood as the configuration and negotiation processes between two endpoints in an end-to-end measurement before a specific measurement.

The following uses the measurement in the direction N1→R1 (NodeB to RNC) as an example to describe a specific measurement.

Step 1904: The NodeB classifies, according to the classification criteria negotiated or determined in advance, IP packet data to form an IP data stream.

In this embodiment, the initiator end may be a NodeB. As described above, the classification criteria are negotiated in step 2102. Specifically, the classification criteria may be an IP packet data size, a source IP address, a destination IP address, and a DSCP value. According to such criteria, the NodeB may divide the packet data into the data stream (class) shown in Table 32.

TABLE 32

(packet size ≤ 100, source IP address = N1, destination IP address = R1, and DSCP = 101000)
(100 < packet size ≤ 1000, source IP address = N1, destination IP address = R1, and DSCP = 101000)
(packet size > 1000, source IP address = N1, destination IP address = R1, and DSCP = 101000)
(packet size = any size, source IP address = N1, destination IP address = R1, and DSCP = 011000)
(packet size = any size, source IP address = N1, destination IP address = R1, and DSCP = 001000)
(packet size = any size, source IP address = N1, destination IP address = R1, and DSCP = 000000)

Step 1905: The NodeB adds a classification ID to the classified IP data stream, where the classification ID indicates the class to which the IP data streams belongs.

In this step, the initiator end NodeB may add a corresponding classification ID to the classified IP data stream. For example, in the embodiment, the IPv4 header ID is used as the classification ID. The classification IDs corresponding to the preceding six types of IP data streams may be shown in Table 33.

TABLE 33

| Classification SN (Stream ID) | ID Field Value | Classification (Data Stream) |
|---|---|---|
| 6 | 0 xxx xxxx xxxx xxxx | Class 6 in Table 5 |
| 5 | 1011 111x xxxx xxxx | Class 5 in Table 5 |
| 4 | 1010 001x xxxx xxxx | Class 4 in Table 5 |
| 3 | 1000 1111 01xx xxxx | Class 3 in Table 5 |
| 2 | 1000 1111 10xx xxxx | Class 2 in Table 5 |
| 1 | 1000 1111 11xx xxxx | Class 1 in Table 5 |

It can be seen from Table 33 that, the last bit (represented by x) of the IPv4 header ID may be used to identify the SN of each class of data streams.

Step 1906: The NodeB sends a mapping relationship between the classification ID and the data stream to the RNC through a negotiation packet.

Step 1907: The NodeB determines measurement contents, a data stream to be measured, and measurement modes.

It is assumed that the measurement contents, the data stream to be measured, and the measurement modes, determined by the NodeB in this embodiment, are:

a) End-to-end connectivity, passive measurement, period 10 ms, measuring only class 6 in Table 5;

b) End-to-end loopback delay, loopback measurement, period 30 ms, measuring only classes 1, 2, and 3 in Table 5; and c) End-to-end PLR, unidirectional measurement, period 30 ms, measuring all classes in Table 5.

In the case of the loopback measurement, it is assumed that the DSCP values received by the return NodeB are shown in Table 34.

TABLE 34

| Classification SN in Table 6 | DSCP |
|---|---|
| 6 | 000000 |
| 5 | 010000 |
| 4 | 010000 |
| 3 | 100000 |
| 2 | 100000 |
| 1 | 100000 |

Therefore, according to the contents a)-c), 10 classes of measurement objects are needed in this embodiment, as shown in Table 35.

| Measurement Object SN (Measurement ID) | Measurement Definition |
|---|---|
| 0x00000000 | End-to-end connectivity, class 6, passive measurement, period 10 ms, direction N1 → R1 |
| 0x00000001 | End-to-end loopback delay, class 1, loopback measurement, period 30 ms, direction N1 → R1 |
| 0x00000002 | End-to-end loopback delay, class 2, loopback measurement, period 30 ms, direction N1 → R1. |
| 0x00000003 | End-to-end loopback delay, class 3, loopback measurement, period 30 ms, direction N1 → R1. |
| 0x00000004 | End-to-end PLR, class 1, unidirectional measurement, period 30 ms, direction N1 → R1. |
| 0x00000005 | End-to-end PLR, class 2, unidirectional measurement, period 30 ms, direction N1 → R1. |
| 0x00000006 | End-to-end PLR, class 3, unidirectional measurement, period 30 ms, direction N1 → R1. |
| 0x00000007 | End-to-end PLR, class 4, unidirectional measurement, period 30 ms, direction N1 → R1. |
| 0x00000008 | End-to-end PLR, class 5, unidirectional measurement, period 30 ms, direction N1 → R1. |
| 0x00000009 | End-to-end PLR, class 6, unidirectional measurement, period 30 ms, direction N1 → R1. |

It can be seen from the preceding table that, the combination of the measurement contents, data stream to be measured, and measurement modes corresponds to a measurement object SN.

Step 1908: The NodeB sends the mapping relationship between the combination of the measurement contents, data stream to be measured, and measurement modes and the measurement ID to the RNC through a negotiation packet.

So far, the negotiation between the initiator end and the receiving end (peer end) for a measurement is completed. The initiator end and the receiving end acquire the mapping relationship between the measurement ID and the measurement items.

The following content uses a specific measurement as an example to describe the measurement starting and the measurement process.

Step 1909: The NodeB carries the measurement ID in the measurement and control packet, sends the packet to the RNC, and starts a measurement between the NodeB and the RNC.

For example, when the measurement contents, the data stream to be measured, and the measurement modes are: end-to-end PLR, class 1, unidirectional measurement, period 30 ms, and direction N1→R1, ID 0x00000004 is carried in the control packet.

In step 1909, the measurement starting is completed. An IPPM measurement is then implemented according to the combination of the measurement contents, data stream to be measured, and measurement modes.

For example, when the preceding combination is: end-to-end PLR, class 1, unidirectional measurement, period 30 ms, direction N1→R1, the following steps need to be implemented with reference to the process shown in FIG. 15.

Step 1910: The NodeB starts the identifier packet-based measurement of the PLR through a start packet when the preconfigured threshold parameter $T_{10}$ (the threshold parameter may be configured in the threshold table described in step 2101) arrives, where the threshold parameter carries a timestamp $T_{10}$.

Step 1911: The NodeB sends to the RNC the IP data stream to which the ID information is added in the form of service streams one after another.

Step 1912: When the preconfigured threshold parameter $T_{11}$ arrives, the NodeB counts the number of service packets of class 1 received within the time range $T_{10}$-$T_{11}$, and sends the number (N) of sent packets to the RNC in an end packet.

Step 1913: The RNC counts the number (M) of packets of class 1 received within the preconfigured threshold parameter $T_{20}$-$T_{21}$, obtains the PLR according to the number (M) of received packets and the number (N) of sent packets, and returns the PLR to the NodeB through the measurement result packet.

Afterwards, because the measurement period in this embodiment is 30 ms, steps 1910-1912 are repeatedly performed using 30 ms as the period after the first service packet is sent.

The measurement contents and measurement modes are specifically described above, which are not repeatedly described here. In addition, in this embodiment, the measurement in the direction N1→R1 is described. However, the measurement processes in the directions N2→R2, R1→N1, and R2→N2 are similar to that in the direction N1→R1, which is not repeatedly described here.

In this embodiment, a WCDMA system is used as an example for illustration, but the method may also apply to systems such as a long term evolution (LTE) system or a worldwide interoperability for microwave access (WiMAX) system. The protocol stack of the WCDMA system may include an IP, a UDP, and a Frame Protocol (FP). The protocol stack of the LTE system may include an IP, a UDP, and a GPRS Tunneling Protocol for the user plane (GTPU). The protocol stack of the WiMAX system may include an IP and a GRE. In the LTE system, two endpoints may be an evolved NodeB (eNodeB) and a signaling gateway (SGW). In the WiMAX system, two endpoints may be a base transceiver station (BTS) and an access gateway (AGW), and a GRE key is used as the stream ID. Of course, other network nodes may also be used in different systems.

This embodiment may apply to the IP network performance measurement in the DiffServ network architecture by configuring information and creating the DSCP mapping table.

The implementation process of various types of measurement contents is described above. Corresponding control needs to be performed according to the measurement results to achieve the QoS. The measurement results of IP network performance in the measurement direction may be used by the sending end to control the local data transmission to more effectively utilize the network. The following describes the method for controlling the QoS.

The QoS control in this embodiment may include rate control, stream transmission control, and active/standby link switchover control, which are respectively described as follows.

As regards the rate control, the PLR and the unidirectional delay jitter are used in this embodiment to perform the transmission rate control.

Figure 20:
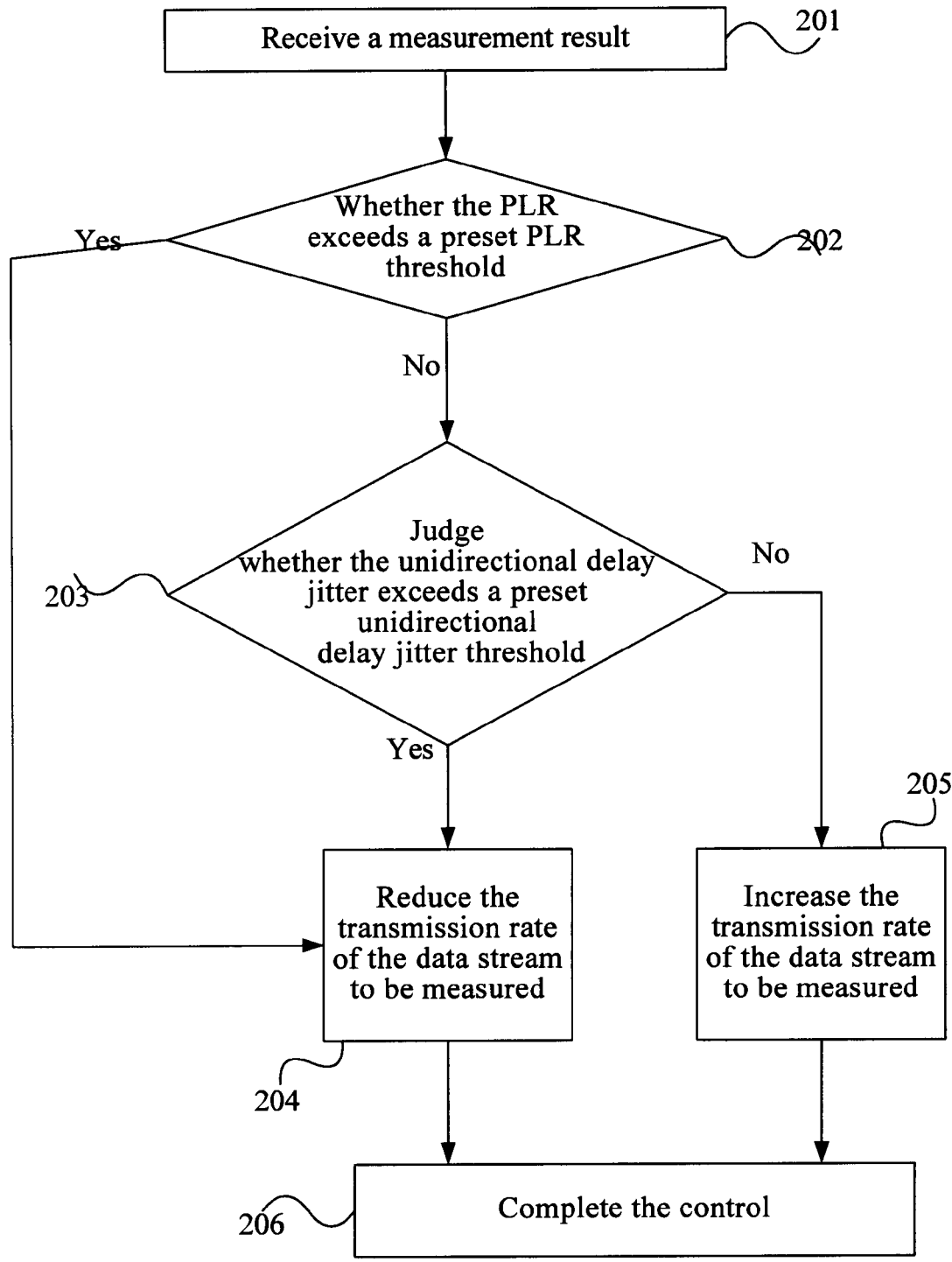
FIG. 20 is a schematic flow chart of a method for controlling a rate using a qualitative mode according to another embodiment of the present invention.

FIG. 20 is a schematic flow chart of a method for controlling a rate using a qualitative mode according to an embodiment of the present invention. Referring to FIG. 20, the method may specifically include:

Step 201: Receive a measurement report, which includes a PLR and unidirectional delay jitter.

Step 202: Determine whether the PLR exceeds a preset PLR threshold, and if the PLR exceeds the preset threshold, perform step 204; and if the PLR does not exceed the preset threshold, perform step 203.

Step 203: Determine whether the unidirectional delay jitter exceeds a preset unidirectional delay jitter threshold, and if the unidirectional delay jitter exceeds the preset threshold, perform step 204; and if the unidirectional delay jitter does not exceed the preset threshold, perform step 205.

Step 204: Reduce the transmission rate of the data stream to be measured, and then perform step 206.

Step 205: Increase the transmission rate of the data stream to be measured, and then perform step 206.

Step 206: Complete the rate control.

With the control solution in this embodiment, the measurement report may be received and processed through the control module of the measurement initiator end.

In this embodiment, there is no time sequence limitation on the judgment of the PLR and the unidirectional delay jitter.

Figure 21:
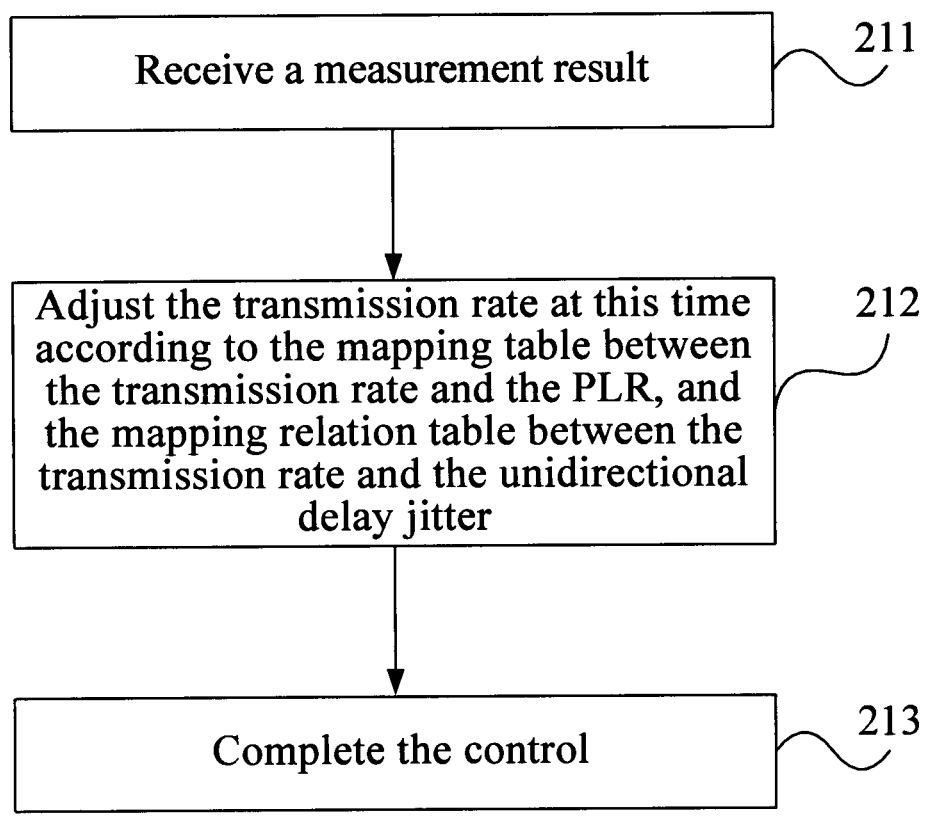
FIG. 21 is a schematic flow chart of a method for controlling a rate using a quantitative mode according to another embodiment of the present invention.

The rate control process in the qualitative mode is provided above, but control of the extent to which a specific rate may be increased or reduced may be achieved according to the following FIG. 21.

FIG. 21 is a schematic flow chart of a method for controlling a rate using a quantitative mode according to an embodiment of the present invention. Referring to FIG. 21, the method may specifically include:

Step 211: Receive a measurement report, which includes a PLR and unidirectional delay jitter.

Step 212: Adjust the transmission rate according to the mapping relation table between the transmission rate and the PLR and the mapping relation table between the transmission rate and the unidirectional delay jitter.

Step 213: Complete the rate control.

In this rate control policy, the sending end, according to the network conditions, presets at the controlling end a mapping relation table between the transmission rate and the PLR, and a mapping relation table between the transmission rate and unidirectional delay jitter at each service priority. When the network performance is poorer than the preset threshold, the transmission rate is correspondingly adjusted to the matched rate according to a corresponding mapping relation table. Such an adjustment is dynamic and is performed stepwise. The step of the adjustment may be dynamically configured. The mapping relation table between the transmission rate and the PLR may be shown in Table 36, and the mapping relation table between the transmission rate and the unidirectional delay jitter may be shown in Table 37. (Tables 36 and 37 are only examples. Mapping relation tables in practical implementation may be different from the examples.)

TABLE 36

| Packet Lose Ratio | Transmission Rate (Percentage of the Current Rate to the Previous Rate) |
|---|---|
| <5% | 100% |
| 5%-10% | 80% |
| 10%-20% | 60% |
| >20% | 20% |

TABLE 37

| Unidirectional Delay Jitter | Transmission Rate (Percentage of the Current Rate to the Previous Rate) |
|---|---|
| <1000 μs | 100% |
| 1000-2000 μs | 80% |
| 2000-5000 μs | 60% |
| >5000 μs | 20% |

For example, when the PLR is within the range of 5%-10% and the unidirectional delay jitter is <1000 μs, the transmission rate is adjusted to (80%)×(100%) of the last transmission rate. Table 36 and Table 37 are only examples and may be configured according to the actual network conditions. For example, on a high-speed and exclusive network with a low convergence ratio, the transmission rate may be configured as high as possible; and on a low-speed and shared network with a high convergence ratio, the transmission rate needs to be configured cautiously.

As regards the stream transmission control, a connectivity measurement result is used in this embodiment of the present invention to enable or disable the stream transmission.

Figure 22:
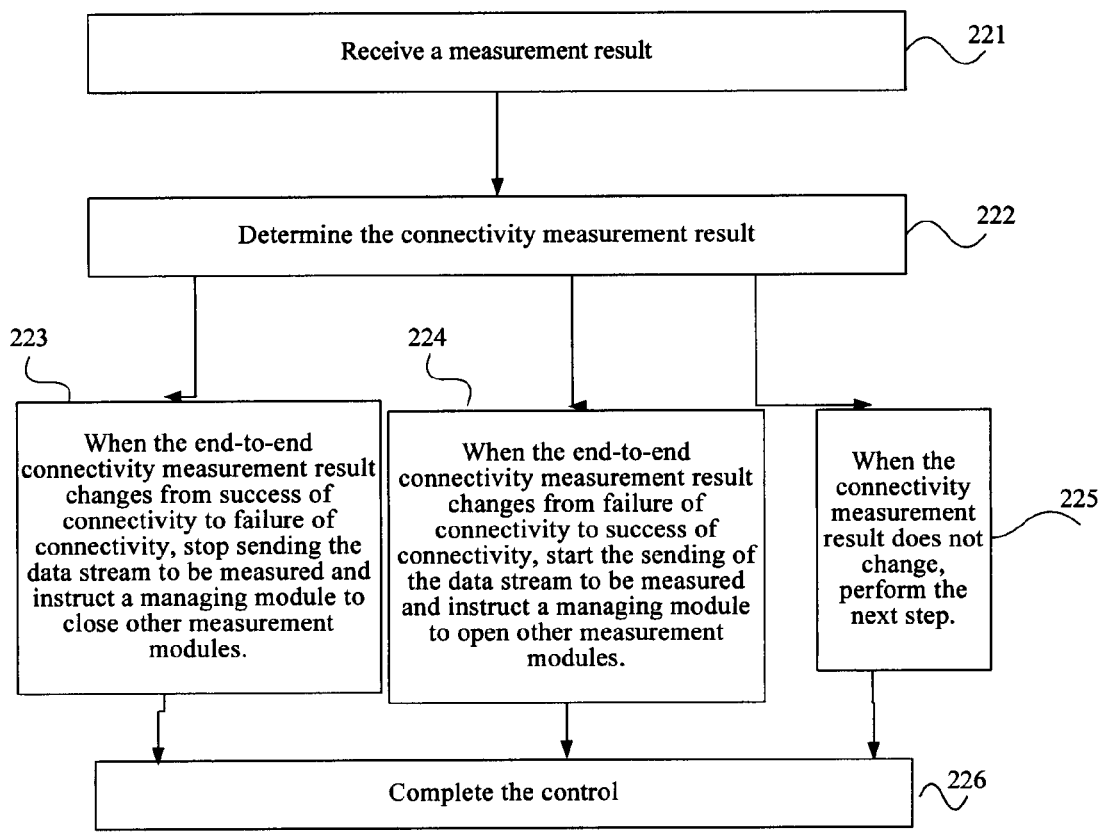
FIG. 22 is a schematic flow chart of a method for stream control according to another embodiment of the present invention.

FIG. 22 is a schematic flow chart of a method for stream control according to an embodiment of the present invention. Referring to FIG. 22, the method may specifically include:

Step 221: A controlling module receives a measurement report including a connectivity measurement result.

Step 222: Determine the connectivity measurement result.

Step 223: When the connectivity measurement result changes from success of connectivity to failure of connectivity, stop sending the data stream to be measured, instruct a managing module to close other measurement modules, and then perform step 226.

Step 224: When the connectivity measurement result changes from failure of connectivity to success of connectivity, start sending the data stream to be measured, instruct the managing module to open other measurement modules, and then perform step 226.

Step 225: When the connectivity measurement result does not change, perform step 226.

Step 226: Complete the stream transmission control.

In this embodiment, a "slow start" mode may be used. When the stream is started, the stream data transmission rate is set to the minimum. The stream control is implemented using the preceding rate control process to gradually enable the stream transmission rate to tend to stabilization.

As regard the active/standby link switchover control: In case of dividing transmission, connectivity and a delay may be used for the active/standby link switchover control.

Figure 23:
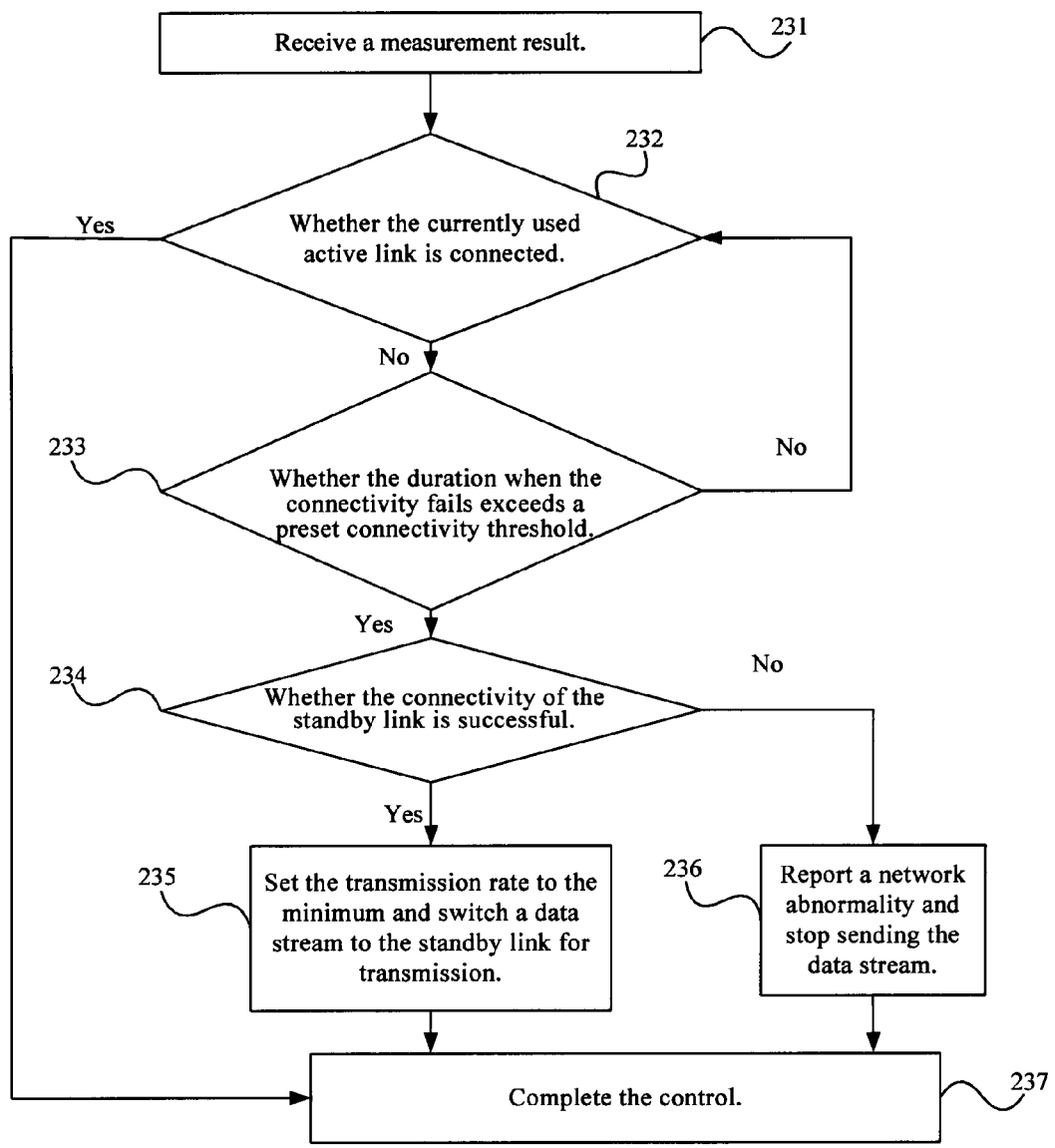
FIG. 23 is a schematic flow chart of a method for performing an active/standby link switchover using a connectivity measurement result according to another embodiment of the present invention.

FIG. 23 is a schematic flow chart of a method for performing an active/standby link switchover using a connectivity measurement result according to an embodiment of the present invention. Referring to FIG. 23, the method may specifically include:

Step 231: Receive a measurement report, where the measurement report includes a connectivity measurement result.

Step 232: Determine, according to the connectivity measurement result, whether the currently used active link is connected, and if the active link is connected, perform step 237; otherwise, perform step 233.

Step 233: Determine whether the duration when the connectivity fails exceeds a preset connectivity threshold, and if the duration exceeds the preset threshold, perform step 234; otherwise, repeatedly perform step 232.

Step 234: Determine whether the connectivity of a standby link is successful, and if the connectivity of the standby link is successful, perform step 235; otherwise, perform step 236.

Step 235: Set the transmission rate to the minimum, switch a data stream to the standby link for transmission, and then perform step 237.

Step 236: Report a network abnormality, stop sending the data stream, and then perform step 237.

Step 237: Complete the active/standby link switchover control.

In this embodiment, the connectivity measurement result is used in the active/standby link switchover process. Such a switchover applies to the scenario where multiple different end-to-end physical links are connected. When the active link is disconnected from the transmission network, the network performance of the standby link needs to be considered. If the standby link is available, data transmission is switched to the standby link; otherwise, the connectivity measurement is still performed on the active link. During an initial switchover, a "slow-start" policy is used. The transmission rate is adjusted based on the PLR and the delay jitter to make the transmission rate gradually reach the optimal value.

Figure 24:
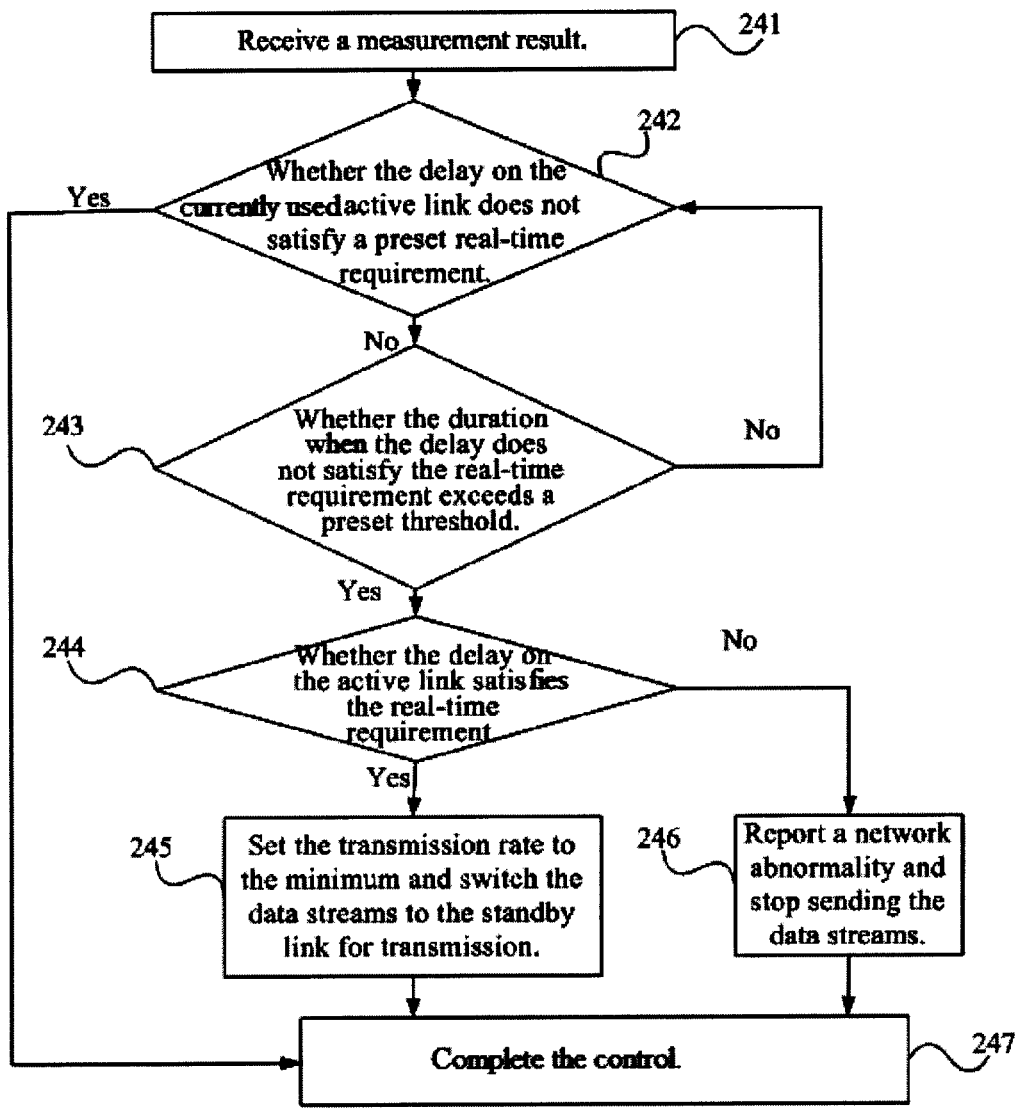
FIG. 24 is a schematic flow chart of a method for performing an active/standby link switchover using a delay measurement result according to another embodiment of the present invention.

FIG. 24 is a schematic flow chart of a method for performing an active/standby link switchover using a delay measurement result according to an embodiment of the present invention. Referring to FIG. 24, the method may specifically include:

Step 241: Receive a measurement report, where the measurement report includes a delay measurement result.

Step 242: Determine, according to the delay measurement result, whether the delay on the currently used active link goes beyond the preset real-time requirement, and if the delay goes beyond the preset real-time requirement, perform step 243; otherwise, perform step 247.

Step 243: Determine whether the duration when the delay goes beyond the real-time requirement reaches a preset delay threshold, and if the duration reaches the preset delay threshold, perform step 244; otherwise, repeatedly perform step 242.

Step 244: Determine whether the delay on the standby link satisfies the real-time requirement, and if the delay satisfies the real-time requirement, perform step 245; otherwise, perform step 246.

Step 245: Set the transmission rate to the minimum, switch a data stream to the standby link for transmission, and then, perform step 247.

Step 246: Report a network abnormality, stop sending the data stream, and then, perform step 247.

Step 247: Complete the active/standby link switchover control.

A unidirectional delay is used to control service streams having a high real-time requirement, for example, EF services corresponding to voice services. In the scenario of dividing transmission, the unidirectional delay is used to switch the transmission path. For services having a high requirement on the delay, delay performance of the stream services is used in the active/standby link switchover process. Such a switchover applies to the scenario where multiple different end-to-end physical links are connected. Generally, a high performance network is used to transmit services having high real-time requirements. When the high performance network cannot meet the real-time requirements (the delay measured is very high), network performance of the standby link needs to be considered. If the standby link satisfies the real-time requirements, data transmission is switched to the standby link; otherwise, the active link is still used. Likewise, during an initial switchover, a "slow-start" policy is used. The transmission rate is adjusted based on the PLR and the delay jitter to make the transmission rate gradually reach the optimal value.

Figure 25:
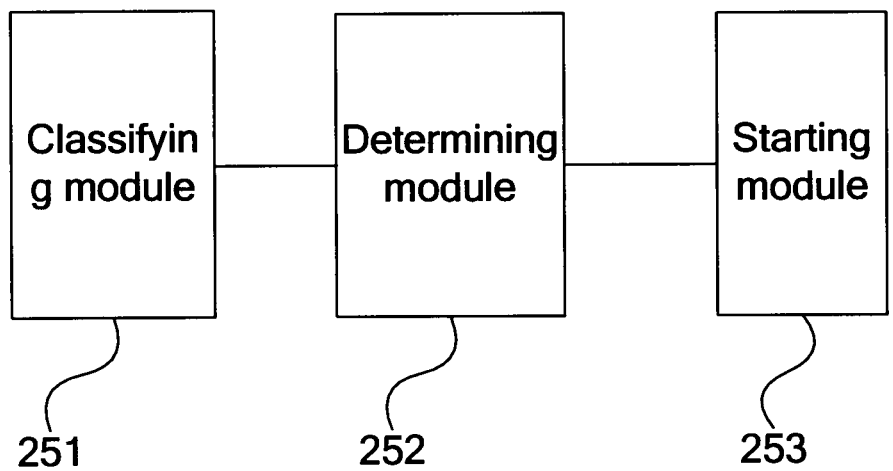
FIG. 25 is a schematic structural diagram of a measuring apparatus according to another embodiment of the present invention.

FIG. 25 is a schematic structural diagram of a measuring apparatus according to an embodiment of the present invention. The apparatus includes a classifying module 251, a determining module 252, and a starting module 253.

The classifying module 251 is configured to classify IP packet data to form an IP data stream and add a classification ID to the classified IP data stream, where the classification ID indicates a class to which the IP data stream belongs. The determining module 252 is configured to select at least one IP data stream as a data stream to be measured, and determine measurement contents and measurement modes. The starting module 253 is configured to send combination information about the measurement contents, the data stream to be measured, and the measurement modes to an IP network performance measurement peer end, and start an IP network performance measurement of the measurement contents of the data stream to be measured according to the measurement modes.

The apparatus in this embodiment may be set at a layer of a network endpoint. For example, the apparatus may be set at an end-to-end measurement and control point 1, an end-to-end measurement and control point 2, an end-to-end measurement and control point 3, or an end-to-end measurement and control point 4 shown in FIG. 4.

The classification ID is the DSCP value; or the classification ID is the field value set for the IP data stream. The classification ID is carried in the IPv4 header ID field of the IP data stream; or the classification ID is carried in the IPv6 Flow Label field of the IP data stream; or the classification ID is carried in the IPsec SA field of the IP data stream; or the classification ID is carried in the GRE key field of the IP data stream; or the classification ID is carried in the UDP port ID field of the IP data stream. The measurement modes and the measurement contents include any one or combination of: using a loopback measurement mode to measure end-to-end connectivity; using a passive measurement mode to measure end-to-end connectivity; using a loopback measurement mode to measure an end-to-end unidirectional delay; using a unidirectional measurement mode to measure an end-to-end unidirectional delay; using a passive measurement mode to measure an end-to-end unidirectional delay; using a loopback measurement mode to measure an end-to-end loopback delay; using a passive measurement mode to measure an end-to-end PLR; using a unidirectional measurement mode to measure an end-to-end PLR; using a passive measurement mode to measure the number of end-to-end received bytes; and using a unidirectional measurement mode to measure the number of end-to-end received bytes.

The classifying module may specifically be configured to classify, according to the preset classification criteria, IP packet data to form an IP data stream. The classification criteria include: a source IP address, a destination IP address, and any one or combination of the following factors: an IP packet data size, a DSCP value, a GRE key, a UDP port ID, a protocol ID, an IPsec SA, and an IP stream ID.

Further, in this embodiment, a setup module may also be included, which is configured to set up a DSCP mapping table. The setup module may include: a first unit, a second unit, and a third unit. The first unit is configured to send a mapping setup request packet to the measurement peer end, where the IP packet body of the mapping setup request packet carries the same DSCP value as the DSCP value in the IP packet header of the mapping setup request packet. The second unit is configured to receive a mapping reply packet returned by the measurement peer end, where the IP packet body of the mapping reply packet carries the DSCP value that is carried in the packet body of the mapping setup request packet and the DSCP value that is carried in the packet header of the mapping setup request packet when the mapping setup request packet is received. The third unit is configured to set up the DSCP mapping table according to the two DSCP values carried in the IP packet body of the mapping reply packet.

In this embodiment, a measuring module may further be included, which is configured to measure the measurement contents of the data stream to be measured according to the measurement modes. When measuring the end-to-end unidirectional delay using the loopback measurement mode, the measuring module is specifically configured to receive a reply packet corresponding to the data stream to be measured, where the priority of the DSCP value carried in the reply packet is higher than the priority of the DSCP value in the data stream to be measured. When measuring the end-to-end PLR or the number of end-to-end received bytes using the unidirectional measurement mode, the measuring module is specifically configured to send a start packet and an end packet to the IP network performance measurement peer end, to enable the measurement peer end or local end to measure the end-to-end PLR of the data stream to be measured between the start packet and the end packet or enable the measurement peer end or the local end to measure the number of end-to-end received bytes of the data stream to be measured between the start packet and the end packet. When measuring the end-to-end PLR using the passive measurement mode or the unidirectional measurement mode, the measuring module is specifically configured to mark the time of leaving the measurement initiator end in the timestamp fields of the data stream to be measured so that the measurement peer end or local end collects statistics about the PLRs of the data stream to be measured within a preset time range; or mark the sequence number for sending the data stream to be measured in the IPv4 header ID field of the data stream to be measured so that the measurement peer end or local end collects statistics about the PLRs of the data stream to be measured within the range of a preset sequence number; or mark the sequence number for sending the data stream to be measured in IPsec SA fields of the data stream to be measured so that the measurement peer end or local end collects statistics about the PLRs of the data stream to be measured within the range of the preset sequence number.

In this embodiment, an estimating module may also be included, which is configured to obtain a unidirectional delay jitter and estimate an end-to-end PLR or validity of the number of end-to-end received bytes using the unidirectional delay jitter.

In this embodiment, a transmission module may also be included, which is configured to send the IP data stream to which a classification ID is added to a measurement peer end.

In this embodiment, a negotiating module may also be included, which is configured to negotiate with a measurement peer end to preset and negotiate measurement parameters. The measurement parameters include measurement contents, measurement modes for various measurement contents, and classification criteria for classifying IP packet data.

According to this embodiment, the combination information about the measurement contents, the data stream to be measured, and the measurement modes is sent to the IP network performance measurement peer end. An IP network performance measurement of the measurement contents of the data stream to be measured is started according to the measurement modes. The intermediate node neither processes the packets, for example, parses the packets, nor cares about the node type. In this manner, an end-to-end measurement is implemented. Through determining the classification criteria, the packet data may be classified according to the multiple classification criteria, and therefore requirements for measurement flexibility are satisfied.

Figure 26:
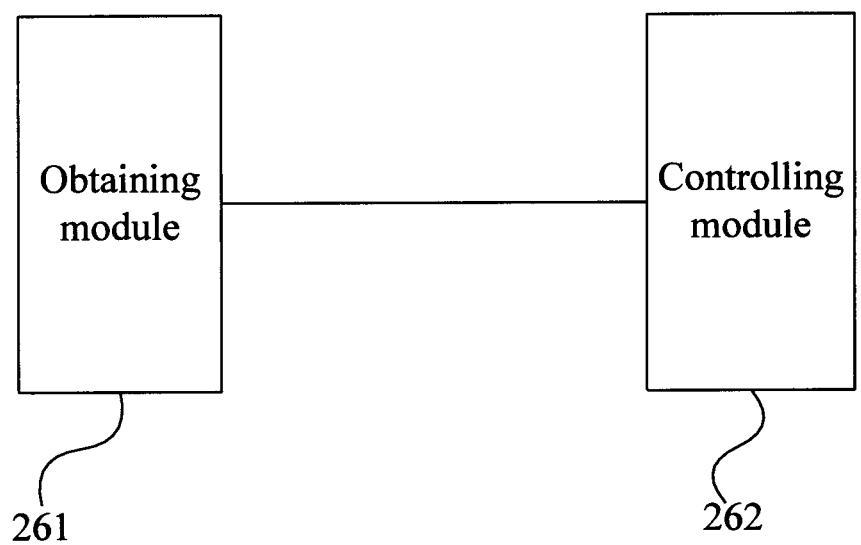
FIG. 26 is a schematic structural diagram of a controlling apparatus according to another embodiment of the present invention.

FIG. 26 is a schematic structural diagram of a controlling apparatus according to an embodiment of the present invention. The apparatus includes an obtaining module 261 and a controlling module 262. The obtaining module 261 is configured to obtain measurement results of an IP network performance measurement, where the measurement results are obtained according to the preceding method. The controlling module 262 is configured to control IP network QoS according to the obtained measurement results.

The apparatus in this embodiment may be set at a layer of a network endpoint, for example, the apparatus may be set at an end-to-end measurement and control point 1, an end-to-end measurement and control point 2, an end-to-end measurement and control point 3, or an end-to-end measurement and control point 4 shown in FIG. 4.

If the measurement results obtained by the obtaining module include an end-to-end PLR and/or an end-to-end unidirectional delay, the controlling module is specifically configured to adjust the transmission rate of the data stream to be measured according to the comparison between the end-to-end PLR and/or the end-to-end unidirectional delay and corresponding thresholds, or adjust the transmission rate of the data stream to be measured according to a preset mapping relation table between the end-to-end PLR and/or the end-to-end unidirectional delay and the transmission rate.

If the measurement results obtained by the obtaining module include connectivity, the controlling module is specifically configured to determine a connectivity measurement result; stop sending the data stream to be measured when the connectivity measurement result changes from success of connectivity to failure of connectivity; start sending the data stream to be measured when the connectivity measurement result changes from failure of connectivity to success of connectivity; or, learn, according to the connectivity measurement result, that the duration when the connectivity of an active link fails exceeds a preset threshold, and switch to a standby link to send the data stream to be measured when the connectivity of the standby link is successful.

If the measurement results obtained by the obtaining module include a unidirectional delay or a loopback delay, the controlling module is specifically configured to learn, according to the measurement results of the unidirectional delay or the loopback delay, that the duration when a delay of the active link does not satisfy real-time requirements exceeds a preset threshold, and switch to a standby link when a delay of the standby link satisfies the real-time requirements.

In this embodiment, the QoS control is implemented according to the measurement results of the IP network performance, which may satisfy the requirements for the QoS of users.

Figure 27:
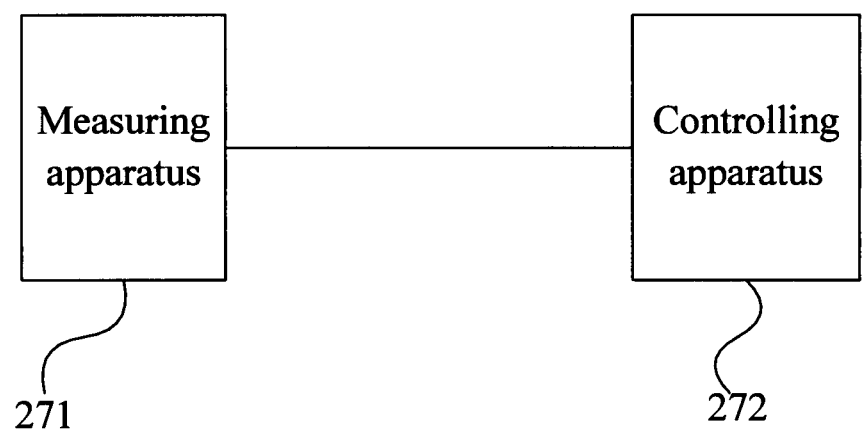
FIG. 27 is a schematic structural diagram of a system according to another embodiment of the present invention.

FIG. 27 is a schematic structural diagram of a system according to an embodiment of the present invention. The system includes a measuring apparatus 271 and a controlling apparatus 272. The measuring apparatus 271 is shown in FIG. 25, and the controlling apparatus 272 is shown in FIG. 26.

The measuring apparatus in the embodiment may specifically be configured to implement the preceding measuring methods, and the controlling apparatus may specifically be configured to implement the preceding controlling methods. The process may be referred to the description of the methods in embodiments, which is not repeatedly described here.

In this embodiment, combination information about the measurement contents, the data stream to be measured, and the measurement modes is sent to the IP network performance measurement peer end. An IP network performance measurement is started according to the measurement contents and the measurement modes. The intermediate node neither processes the packets, for example, parses the packets, nor cares about the node type. In this manner, an end-to-end measurement is implemented. Through determining the classification criteria, the packet data may be classified according to the multiple classification criteria, and therefore requirements for measurement flexibility are satisfied. In addition, the QoS control is implemented according to the measurement results of the IP network performance, which may satisfy the requirements for the QoS of users.

Figure 28:
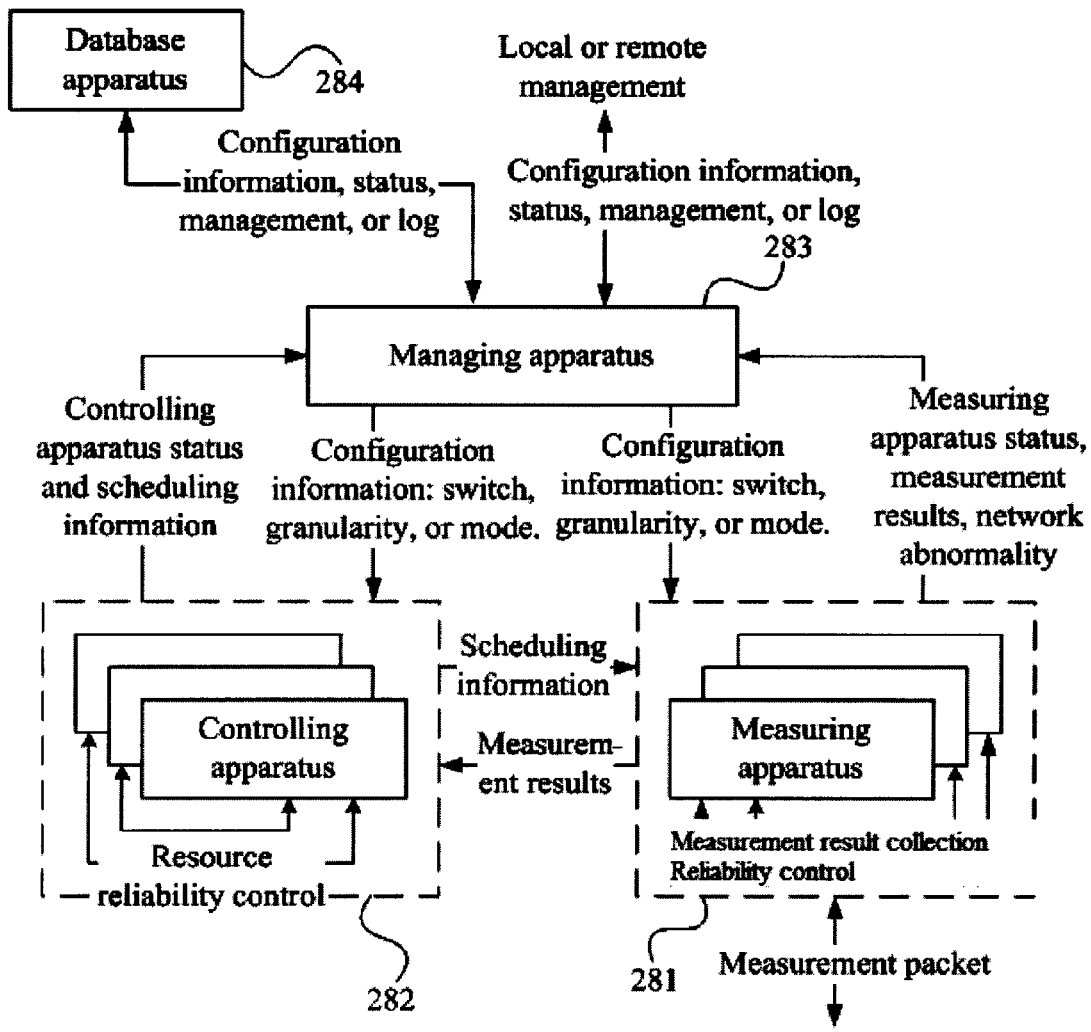
FIG. 28 is a schematic structural diagram of a system according to another embodiment of the present invention.

FIG. 28 is a schematic structural diagram of a system according to an embodiment of the present invention. Based on the preceding embodiment, a managing apparatus 283 and a database apparatus 284 may further be included. That is, a measuring apparatus 281, a controlling apparatus 282, the managing apparatus 283, and the database apparatus 284 are included in this embodiment.

The managing apparatus 283 is configured to set configuration information for the measuring apparatus 281 and the controlling apparatus 282, and receive a measurement result and a control result returned by the measuring apparatus 281 and the controlling apparatus 282 respectively. The database apparatus 284 is connected to the managing apparatus 283 and is configured to save the measurement result and the control result.

There may be multiple measuring modules and controlling modules in this embodiment that are interconnected. Information may be directly exchanged between the measuring apparatus 281 and controlling apparatus 282 or be exchanged through the managing apparatus 283. For improving a feedback speed of the measurement and control, the measuring apparatus 281 and the controlling apparatus 282 may directly exchange the measurement result and scheduling information (for example, reduce or increase a transmission rate) according to the result. Information may also be exchanged between different measuring apparatuses to obtain an overall assessment of the measurement result.

In addition, different controlling and measuring apparatuses may implement a measurement and control of an active/standby switchover. The managing apparatus 283 and the database apparatus 284 may further be configured to respectively receive and save the configuration and control information sent by a remote or nearby console. The specific interaction information may be referred to FIG. 28.

Based on the preceding embodiment, centralized management and saving of data may further be achieved in this embodiment.

Persons skilled in the art may understand that all or part of steps according to the preceding embodiments of the present invention may be implemented by a program instructing relevant hardware. The program may be stored in a computer readable storage medium. When the program is executed, the steps of the methods in the embodiments are performed. The storage medium includes various media, such as a read-only memory (ROM), a random access memory (RAM), a magnetic disk or a compact disk, which can store program code.

The preceding embodiments are used only to describe the technical solutions of the present invention. The technical solutions of the present invention are not limited to those embodiments. Although the present invention is described in detail by referring to the exemplary embodiments, those skilled in the art should understand that various modifications or equivalent replacements can be made according to the embodiments of the present invention. However, such modifications and equivalent replacements cannot make the modified technical solutions depart from the scope of the technical solutions of the present invention.

The invention claimed is:

1. A method for measuring Internet Protocol (IP) network performance, comprising:
adding, by a measurement initiator end, a classification ID in IP packet data according to a classification criteria, wherein the classification criteria comprises: a source IP address, a destination IP address, and any one or combination of the following: an IP packet data size, a differentiated services code point (DSCP) value a generic routing encapsulation (GRE) key a User Datagram Protocol (UDP) port ID, a protocol ID, an IPsec security association (SA), and an IP stream ID, wherein the classification ID indicates a class to which the IP packet data belongs;
selecting at least one IP data stream as a data stream to be measured and determining measurement contents and measurement modes, wherein each IP data stream of the at least one IP data stream comprises the IP packet data with the classification ID; and
sending information about the measurement contents, the data stream to be measured, and the measurement modes to a measurement peer end, and starting measuring the IP network performance according to the measurement contents and the measurement modes when the data stream to be measured is transmitted between the measurement initiator end and the measurement peer end;
wherein when the classification criteria comprises the DSCP value the method further comprises:
sending a mapping setup request packet to the measurement peer end, wherein a payload area of the mapping setup request packet and a header of the mapping setup request packet carry a same first DSCP value;
receiving a mapping reply packet returned by the measurement peer end, wherein the payload area of the mapping reply packet carries the first DSCP value and a second DSCP value in the packet header of the mapping setup request packet when the measurement peer end receives the mapping setup request packet; and
setting up the DSCP mapping table according to the first DSCP value and the second DSCP value that are carried in the payload area of the mapping reply packet.

2. The method according to claim 1, wherein the measurement modes comprise any one or combination of: a loopback measurement mode, a passive measurement mode, and a unidirectional measurement mode; and
the measurement contents comprise any one or combination of: end-to-end connectivity, an end-to-end unidirectional delay, an end-to-end loopback delay, an end-to-end packet loss ratio (PLR), and a quantity of end-to-end received bytes.

3. The method according to claim 2, wherein the determined measurement contents and measurement modes comprise using the loopback measurement mode to measure the end-to-end unidirectional delay, and the method further comprises:

sending, by the measurement initiator end, a measurement packet to the measurement peer end, wherein the measurement packet carries a third DSCP value which is the same as DSCP values of the data stream to be measured; and receiving a measurement reply packet that is corresponding to the measurement packet and returned by the measurement peer end, wherein the measurement reply packet carries a fourth DSCP value having a priority higher than or equal to the priority of the third DSCP value.

4. The method according to claim 2, wherein the determined measurement contents and measurement modes comprise using the unidirectional measurement mode to measure the end-to-end PLR or the quantity of the end-to-end received bytes, and the method further comprises:

sending, by the measurement initiator end, a start packet and an end packet to the measurement peer end, to notify the measurement peer end to measure the end-to-end PLR or the quantity of the end-to-end received bytes of the data stream to be measured between the start packet and the end packet.

5. The method according to claim 2, wherein the method further comprises: obtaining a unidirectional delay jitter, and estimating the end-to-end PLR or validity of the quantity of the end-to-end received bytes using the unidirectional delay jitter.

6. The method according to claim 2, wherein the determined measurement contents and measurement modes comprise using the passive measurement mode or the unidirectional measurement mode to measure the end-to-end PLR, and the method further comprises one of the following (a), (b) and (c):

(a) marking time of leaving the measurement initiator end in a timestamp field of the data stream to be measured so that the measurement peer end collects statistics about a PLR of the data stream to be measured within a preset time range;

(b) marking a sequence number for sending the data stream to be measured in a IPv4 header ID field of the data stream to be measured so that the measurement peer end collects the statistics about the PLR of the data stream to be measured within a range of a preset sequence number; and (c) marking the sequence number for sending the data stream to be measured in an IPsec security association (SA) field of the data stream to be measured so that the measurement peer end collects the statistics about the PLR of the data stream to be measured within the range of the preset sequence number.

7. The method according to claim 1, wherein the method further comprises:

negotiating measurement parameters with the measurement peer end, wherein the measurement parameters comprise the measurement contents, the measurement modes, and the classification criteria of the IP packet data.

8. A method for controlling Internet Protocol (IP) network quality of service (QoS), comprising:

obtaining measurement results of an IP network performance measurement, wherein the measurement results are values of the measurement contents obtained using the method according to claim 1; and controlling the IP network QoS according to the obtained measurement results.

9. The method according to claim 8, wherein if the measurement results comprise an end-to-end packet loss ratio (PLR) and/or an end-to-end unidirectional delay, the controlling the IP network QoS comprises:

adjusting a transmission rate of the data stream to be measured according to the comparison between the end-to-end PLR and/or the end-to-end unidirectional delay and corresponding thresholds; or adjusting the transmission rate of the data stream to be measured according to a preset mapping relation table between the end-to-end PLR and/or the end-to-end unidirectional delay and the transmission rate.

10. The method according to claim 8, wherein if the measurement results comprise end-to-end connectivity, the controlling the IP network QoS comprises:

stopping sending the data stream to be measured when the end-to-end connectivity changes from success to failure, and starting sending the data stream to be measured when the end-to-end connectivity changes from failure to success; or, switching to a standby link to send the data stream to be measured if a link failure duration for the end-to-end connectivity of an active link exceeds a preset threshold and the end-to-end connectivity of a standby link is successful.

11. The method according to claim 8, wherein if the measurement results comprise an end-to-end unidirectional delay or an end-to-end loopback delay, the controlling the IP network QoS comprises:

learning, according to the measurement results of the end-to-end unidirectional delay or end-to-end loopback delay, that the duration when a delay of an active link does not satisfy real-time requirements exceeds a preset threshold, and switching to a standby link to send the data stream to be measured when a delay of the standby link satisfies the real-time requirements.

12. An apparatus for measuring Internet Protocol (IP) network performance, comprising:

a classifying module, configured to classify IP packet data to form an IP data stream and add a classification ID to the classified IP data stream according to a classification criteria, wherein the classification criteria comprises: a source IP address a destination IP address and any one or combination of the following: an IP packet data size, a differentiated services code point (DSCP) value, a generic routing encapsulation (GRE) key, a User Datagram Protocol (UDP) port ID, a protocol ID, an IPsec security association (SA), and an IP stream ID, wherein the classification ID indicates a class to which the IP data stream belongs;

a determining module, configured to select at least one IP data stream as a data stream to be measured, and determine measurement contents and measurement modes; and a starting module, configured to send combination information about the measurement contents, the data stream to be measured, and the measurement modes to a measurement peer end, and start an IP network performance measurement of the measurement contents of the data stream to be measured according to the measurement modes;

a setup module, configured to send a mapping setup request packet to the measurement peer end, where an IP packet body of the mapping setup request packet carries a same first DSCP value as a second DSCP value in an IP packet header of the mapping setup request packet, receive a mapping reply packet returned by the measurement peer end, where the IP packet body of the mapping reply packet carries the first DSCP value that is carried in the packet body of the mapping setup request packet and the second DSCP value that is carried in the packet header of the mapping setup request packet when the mapping setup request packet is received, and set up a DSCP mapping table according to the first and second DSCP values carried in the IP packet body of the mapping reply packet.

13. The apparatus according to claim 12, comprising:
an estimating module, configured to obtain a unidirectional delay jitter, and estimate an end-to-end packet loss ratio (PLR) or validity of a quantity of end-to-end received bytes using the unidirectional delay jitter.

14. The apparatus according to claim 12, comprising:
a negotiating module, configured to preset and negotiate measurement parameters with a measurement peer end, wherein the measurement parameters comprise the measurement contents, the measurement modes, and the classification criteria for classifying the IP packet data.

* * * * *